US007262977B2

(12) United States Patent
Kyono

(10) Patent No.: US 7,262,977 B2

(45) Date of Patent: Aug. 28, 2007

(54) SWITCHING-MODE POWER SUPPLY HAVING A SYNCHRONOUS RECTIFIER

(75) Inventor: Yoichi Kyono, Niiza (JP)

(73) Assignee: Sanken Electric Co., Ltd. (JP)

(*) Notice: Subject to any disclaimer, the term of this patent is extended or adjusted under 35 U.S.C. 154(b) by 0 days.

(21) Appl. No.: 11/614,474

(22) Filed: Dec. 21, 2006

(65) Prior Publication Data

US 2007/0103946 A1 May 10, 2007

Related U.S. Application Data

(63) Continuation of application No. PCT/JP05/11985, filed on Jun. 29, 2005.

(51) Int. Cl.
*H02M 3/335* (2006.01)
*H02M 7/217* (2006.01)

(52) U.S. Cl. ................................ 363/21.06; 363/21.14

(58) Field of Classification Search .................. 363/20, 363/21.01, 21.06, 21.14, 127
See application file for complete search history.

(56) References Cited

U.S. PATENT DOCUMENTS 5,719,755 A * 2/1998 Usui ........................... 363/19
6,842,350 B2 1/2005 Yamada et al. .......... 363/21.16
6,961,256 B2 * 11/2005 Yang .......................... 363/127
7,120,036 B2 * 10/2006 Kyono .................... 363/21.06
7,123,490 B2 * 10/2006 Amei ...................... 363/21.14
2002/0021574 A1 * 2/2002 Ishii et al. .................... 363/20

FOREIGN PATENT DOCUMENTS

JP 09-163736 A 6/1997
JP 2004-173396 A 6/2004

* cited by examiner

*Primary Examiner*—Gary L Laxton
(74) *Attorney, Agent, or Firm*—Woodcock Wasburn LLP

(57) ABSTRACT

A switching-mode power supply capable of causing conduction through a synchronous rectifier switch exactly when required. Included is a transformer having a primary winding connected to a pair of DC input terminals via an active switch, and a secondary winding connected to a pair of DC output terminals via a synchronous rectifier and a smoothing capacitor. The synchronous rectifier is a parallel connection of a synchronous rectifier switch and a diode. In order to cause conduction through the synchronous rectifier switch while the diode is conducting, there is provided a synchronous rectifier control circuit comprising two current sources, a conduction period determination circuit, and a synchronous rectifier switch control pulse forming circuit.

25 Claims, 14 Drawing Sheets

LOAD
FEEDBACK CIRCUIT
SAWTOOTH GENERATOR 4a
4b
3a
Co
Vo
10
R2
Q14
Q13
11b
I2
9a
D1
Q11
I1
D2
11a
C1
Q12
R1
12
13
15
14
17
20
21
22
16
19
S
Do
Q2
G
D
7a
8
18
N2
V2

ACTIVE SWITCH CONTROL CIRCUIT

SWITCHING-MODE POWER SUPPLY HAVING A SYNCHRONOUS RECTIFIER

CROSS REFERENCE TO RELATED APPLICATIONS

This is a continuation of Application PCT/JP2005/011985, filed Jun. 29, 2005, which claims priority to Japanese Patent Application No. 2004-196685 filed Jul. 2, 2004.

BACKGROUND OF THE INVENTION

This invention relates to an electronic power supply unit known as the switching-mode power supply, and more specifically, to such a power supply of the kind having a synchronous rectifier circuit.

A typical conventional switching-mode power supply with a flyback DC-to-DC converter includes a transformer having a primary winding coupled to the pair of DC input terminals via an active switch, and a secondary winding coupled to the pair of DC output terminals via a rectifying diode and smoothing capacitor. The DC input voltage is rapidly turned on and off as the active switch is driven by pulses that have been width-modulated by a feedback circuit monitoring the DC output voltage. Energy is stored on the transformer during the conducting periods of the active switch and released during its nonconducting periods. The smoothing capacitor is charged as the rectifying diode conducts during the nonconducting periods of the active switch.

A voltage drop of approximately 0.8 volt has been known to occur across the rectifying diode of the above switching-mode power supply. Japanese Unexamined Patent Publication No. 9-163736 teaches how to reduce this voltage drop, and consequent power loss, across the rectifying diode. Connected in parallel with the rectifying diode according to this prior art is a synchronous rectifier switch which is turned on during the conducting periods of the rectifying diode. The synchronous rectifier switch, particularly when in the form of a bipolar or field-effect transistor, introduces a voltage drop of as low as 0.2 volt or so, realizing an appreciable diminution of an overall voltage drop on the output side of the transformer.

This prior art technique has proved to possess its own shortcomings, however. One of them is the difficulty of turning on the synchronous rectifier switch in exact synchronism with the conducting periods of the rectifying diode, these conducting periods being subject to change with the input voltage and with the loading.

Another weakness manifested itself in the event of an abrupt drop in the output voltage of the switching-mode power supply in response to a change in loading. Thereupon the standard feedback circuit of the closed-loop switching regulator responded by correspondingly extending the conducting periods of the active switch. The possible result was the undesired overlapping of the conducting periods of the active switch and those of the synchronous rectifier switch. Such overlapping, if it occurred at all, might lead to noise production and, worse yet, to the destruction of the associated circuit parts.

The yet-unremedied drawbacks of the synchronous rectification technology discussed above are not peculiar to the flyback DC-to-DC converter. The same technology has been applied, at the risk of like contingencies, to other varieties of switching-mode power supplies such as a forward DC-to-DC converter and a chopper converter.

SUMMARY OF THE INVENTION

The present invention seeks to control the on/off operation of the synchronous rectifier switch in switching-mode power supplies of various known types and configurations without the noted difficulties encountered heretofore.

A switching-mode power supply for DC-to-DC conversion, comprising DC input means for inputting a DC voltage, DC output means for outputting a DC voltage, inductance means connected between the DC input means and the DC output means, switching means including an active switch connected between the DC input means and the inductance means for switching the DC input voltage on and off, an active switch control circuit connected to the active switch for on/off control thereof, a smoothing capacitor connected to the DC output means and in series with the inductance means, a synchronous rectifier switch connected in parallel with the serial connection of the inductance means and the smoothing capacitor, a rectifying diode connected in parallel with the synchronous rectifier switch, and a synchronous rectifier control circuit connected to the synchronous rectifier switch for on/off control thereof. The synchronous rectifier control circuit comprises a synchronous rectification period determination capacitor for providing a voltage for determination of periods of time during which the synchronous rectifier switch is to conduct, a first current source connected to the synchronous rectification period determination capacitor for charging the same with a current corresponding to a voltage across the inductance means during the conducting periods of the active switch, a second current source connected to the synchronous rectification period determination capacitor for permitting the flow of a discharge current corresponding to the DC output voltage, active switch status means for providing an active switch status signal indicative of whether the active switch is on or off, conduction period detect means connected to the active switch status means for providing, in response to the active switch status signal, a signal indicative of periods of time during which the synchronous rectifier switch is to be held conductive, and a synchronous rectifier switch control pulse forming circuit having inputs connected to the synchronous rectification period determination capacitor and the conduction period detect means, and an output connected to the synchronous rectifier switch, for causing conduction through the synchronous rectifier switch when the voltage across the synchronous rectifier period determination capacitor is higher than a prescribed value and at the same time when the signal from the conduction period detect means indicates that the synchronous rectifier switch be held conductive.

By the term “a current corresponding to a voltage across the inductance means” as used in the foregoing summary of the invention and in the claims appended hereto is meant a current that varies in magnitude with the voltage across the inductance means, increasing when the voltage across the inductance means rises above a predefined value and decreasing when that voltage falls below the predefined value. The “voltage across the inductance means” may for example be a voltage across the secondary winding of a transformer or across a smoothing inductor. The term “a discharge current corresponding to the DC output voltage” as used above and in the attached claims likewise means a discharge current that varies in magnitude with the DC output voltage, increasing when the DC output voltage rises above the rating and decreasing when that voltage falls below the rating.

The "inductance means" may take the form of a transformer having a primary winding connected to the DC input means via the active switch, and a secondary winding connected to the DC output means via the smoothing capacitor. The synchronous rectifier switch may be serially inserted in a current path from the secondary winding to the smoothing capacitor. The rectifying diode may be so oriented as to be reverse biased by a voltage induced in the secondary winding during the conducting periods of the active switch.

The switching means may comprise a primary winding connected to the DC input means via the active switch, a secondary winding electromagnetically coupled to the primary winding and connected to the smoothing capacitor, and a rectifier serially inserted in a current path from the secondary winding to the smoothing capacitor. The inductance means may then comprise a smoothing inductor serially inserted in the current path from the secondary winding to the smoothing capacitor, and the synchronous rectifier switch may be connected in parallel with the serial connection of the smoothing inductor and the smoothing capacitor and, via the rectifier, with the secondary winding.

The inductance means may comprise a smoothing inductor serially inserted in the current path from the DC input means to the smoothing capacitor. The active switch may then be connected between the DC input means and the smoothing inductor, and the synchronous rectifier switch may be connected in parallel with the smoothing capacitor via the smoothing inductor.

The synchronous rectifier control circuit may further comprise discharge inhibit means for inhibiting the discharge of the synchronous rectification period determination capacitor during the conducting periods of the active switch.

The first current source of the synchronous rectifier control circuit may provide a first current for charging the synchronous rectification period determination capacitor during the conducting periods of the active switch, and the second current source of the synchronous rectifier control circuit may provide a second current for causing the synchronous rectification period determination capacitor to discharge during the nonconducting periods of the active switch. The ratio of the first to the second current may then be equal to the ratio of a voltage across the inductance means during the conducting periods of the active switch plus the DC output voltage to the DC output voltage.

The first current source of the synchronous rectifier control circuit may provide a first current for charging the synchronous rectification period determination capacitor during the conducting periods of the active switch, and the second current source of the synchronous rectifier control circuit may provide a second current for causing the synchronous rectification period determination capacitor to discharge during the nonconducting periods of the active switch. The ratio of the first to the second current may then be equal to the ratio of a voltage across the synchronous rectifier switch during the conducting periods of the active switch minus a predefined voltage to the DC output voltage.

The first current source of the synchronous rectifier control circuit may provide a first current for charging the synchronous rectification period determination capacitor during the conducting periods of the active switch, and the second current source of the synchronous rectifier control circuit may provide a second current for causing the synchronous rectification period determination capacitor to discharge during the nonconducting periods of the active switch. The ratio of the first to the second current may then be equal to the ratio of a voltage across the inductance means during the conducting periods of the active switch to the DC output voltage.

The first current source of the synchronous rectifier control circuit may supply a first current to both the synchronous rectification period determination capacitor and the second current source during the conducting periods of the active switch, and the second current source of the synchronous rectifier control circuit may provide a second current for causing the synchronous rectification period determination capacitor to discharge during both conducting and nonconducting periods of the active switch. The ratio of the first current minus the second current to the second current may then be equal to the ratio of a voltage across the synchronous rectifier switch during the conducting periods of the active switch minus the DC output voltage to the DC output voltage.

The first and the second current source of the synchronous rectifier control circuit may both be current mirrors.

The first current source of the synchronous rectifier control circuit may comprise a first transistor having an emitter connected to the synchronous rectifier switch and a collector connected to the synchronous rectification period determination capacitor of the synchronous rectifier control circuit, a second transistor having an emitter connected to the emitter of the first transistor of the first current source and a base and a collector both connected to a base of the first transistor of the first current source, and a collector resistor connected between the collector of the second transistor of the first current source and the synchronous rectifier switch.

The first current source of the synchronous rectifier control circuit may comprise a first transistor having an emitter connected to the synchronous rectifier switch and a collector connected to the synchronous rectification period determination capacitor of the synchronous rectifier control circuit, a second transistor having an emitter connected to the emitter of the first transistor of the first current source and a base and a collector both connected to a base of the first transistor of the first current source, a collector resistor connected between the collector of the second transistor of the first current source and the synchronous rectifier switch, and a zener diode connected between the synchronous rectifier switch and the emitter of the first transistor of the first current source, the zener diode having a zener voltage equal to the DC output voltage.

The first current source of the synchronous rectifier control circuit may comprise a first transistor having an emitter connected to the synchronous rectifier switch and a collector connected to the synchronous rectification period determination capacitor of the synchronous rectifier control circuit, a second transistor having an emitter connected to the emitter of the first transistor of the first current source and a base and a collector both connected to a base of the first transistor of the first current source, and a collector resistor having one extremity connected to the collector of the second transistor of the first current source and another extremity connected to the DC output means.

The second current source of the synchronous rectifier control circuit may comprise a first transistor having an emitter connected to the smoothing capacitor and a collector connected to the synchronous rectification period determination capacitor of the synchronous rectifier control circuit, a second transistor having an emitter connected to the smoothing capacitor and a base and a collector both connected to a base of the first transistor of the second current source, and a collector resistor connected between the smoothing capacitor and the collector of the second transistor of the second current source.

The discharge inhibit means may comprise a selective discharge diode connected between the synchronous rectification period determination capacitor of the synchronous rectifier control circuit and the collector of the first transistor of the second current source and a bias diode connected between the synchronous rectifier switch and the collector of the first transistor of the second current source.

The discharge inhibit means may comprise a discharge inhibit switch connected in parallel with the second transistor of the second current source, and a discharge inhibit control circuit for causing conduction through the discharge inhibit switch during the conducting periods of the active switch.

The first current source of the synchronous rectifier control circuit mat comprise a first transistor having an emitter connected to the synchronous rectifier switch and a collector connected to the synchronous rectification period determination capacitor of the synchronous rectifier control circuit, a second transistor having an emitter connected to the emitter of the first transistor of the first current source and a base and a collector both connected to a base of the first transistor of the first current source, and a collector resistor connected between the collector of the second transistor of the first current source and the synchronous rectifier switch. The second current source may comprise a first transistor having an emitter connected to the smoothing capacitor and a collector connected to the synchronous rectification period determination capacitor of the synchronous rectifier control circuit, a second transistor having an emitter connected to the smoothing capacitor and a base and a collector both connected to a base of the first transistor of the second current source, and a collector resistor connected between the smoothing capacitor and the collector of the second transistor of the second current source.

The synchronous rectifier control circuit may further comprise a discharge adjustment resistor connected in parallel with the synchronous rectification period determination capacitor.

The active switch status means of the synchronous rectifier control circuit may be connected to the synchronous rectifier switch for obtaining the active switch status signal from a voltage across the synchronous rectifier switch.

The synchronous rectifier switch control pulse forming circuit of the synchronous rectifier control circuit may comprise a reference voltage source for providing the prescribed value, a comparator having a first input connected to the synchronous rectification period determination capacitor of the synchronous rectifier control circuit and a second input connected to the reference voltage source, and a logic circuit having a first input connected to the conduction period detect means of the synchronous rectifier control circuit and a second input connected to the comparator, for causing conduction through the synchronous rectifier switch when the active switch is off and at the same time when the voltage across the synchronous rectification period determination capacitor is higher than the reference voltage.

The synchronous rectifier switch control pulse forming circuit of the synchronous rectifier control circuit may comprise a first logic circuit connected to the synchronous rectification period determination capacitor of the synchronous rectifier control circuit for providing an output indicative of whether the voltage across the synchronous rectification period determination capacitor is higher than a preset threshold or not, and a second logic circuit having a first input connected to the conduction period detect means of the synchronous rectifier control circuit, and a second input connected to the first logic circuit, for causing conduction through the synchronous rectifier switch when the active switch is off and at the same time when the voltage across the synchronous rectification period determination capacitor is higher than the threshold.

The synchronous rectifier control circuit may be in the form of an integrated circuit.

The synchronous rectifier switch and the rectifying diode and the synchronous rectifier control circuit may be packaged in a single envelope.

Another aspect of the invention concerns a switching-mode power supply for DC-to-DC conversion, comprising DC input means for inputting a DC voltage, DC output means for outputting a DC voltage, inductance means connected between the DC input means and the DC output means, switching means including an active switch connected between the DC input means and the inductance means for switching the DC input voltage on and off, an active switch control circuit connected to the active switch for on/off control thereof, a smoothing capacitor connected to the DC output means and in series with the inductance means, a synchronous rectifier switch connected in parallel with the serial connection of the inductance means and the smoothing capacitor, a rectifying diode connected in parallel with the synchronous rectifier switch, and a synchronous rectifier control circuit connected to the synchronous rectifier switch for on/off control thereof. The synchronous rectifier control circuit may comprise a synchronous rectification period determination capacitor for providing a voltage for determination of periods of time during which the synchronous rectifier switch is to conduct, a charge circuit connected to the synchronous rectification period determination capacitor for charging the same during the conducting periods of the active switch, a discharge circuit connected to the synchronous rectification period determination capacitor for permitting the flow of a current discharged therefrom, active switch status means for providing an active switch status signal indicative of whether the active switch is on or off, conduction period detect means connected to the active switch status means for providing, in response to the active switch status signal, a signal indicative of periods of time during which the synchronous rectifier switch is to be held conductive, a synchronous rectifier switch control pulse forming circuit having inputs connected to the synchronous rectification period determination capacitor and the conduction period detect means, and an output connected to the synchronous rectifier switch, for causing conduction through the synchronous rectifier switch when the voltage across the synchronous rectifier period determination capacitor is higher than a prescribed value and at the same time when the signal from the conduction period detect means indicates that the synchronous rectifier switch be held conductive, a compulsory discharge switch connected in parallel with the synchronous rectification period determination capacitor, and a compulsory discharge switch control circuit connected to the compulsory discharge switch for causing conduction therethrough for a prescribed period of time following the end of each conducting period of the synchronous rectifier switch or the beginning of each conducting period of the active switch.

Still another aspect of the invention concerns a switching-mode power supply for DC-to-DC conversion, comprising DC input means for inputting a DC voltage, DC output means for outputting a DC voltage for application to a load to be connected thereto, inductance means connected between the DC input means and the DC output means, switching means including an active switch connected between the DC input means and the inductance means for switching the DC input voltage on and off, an active switch control circuit connected to the active switch for on/off control thereof, a smoothing capacitor connected to the DC output means and in series with the inductance means, a synchronous rectifier switch connected in parallel with the serial connection of the inductance means and the smoothing capacitor, a rectifying diode connected in parallel with the synchronous rectifier switch, a synchronous rectification period determination capacitor for providing a voltage for determination of periods of time during which the synchronous rectifier switch is to conduct, a charge circuit connected to the synchronous rectification period determination capacitor for charging the same during the conducting periods of the active switch, a discharge circuit connected to the synchronous rectification period determination capacitor for permitting the flow of a current discharged therefrom, active switch status means for providing an active switch status signal indicative of whether the active switch is on or off, conduction period detect means connected to the active switch status means for providing, in response to the active switch status signal, a signal indicative of periods of time during which the synchronous rectifier switch is to be held conductive, a synchronous rectifier switch control pulse forming circuit having inputs connected to the synchronous rectification period determination capacitor and the conduction period detect means, and an output connected to the synchronous rectifier switch, for causing conduction through the synchronous rectifier switch when the voltage across the synchronous rectifier period determination capacitor is higher than a prescribed value and at the same time when the signal from the conduction period detect means indicates that the synchronous rectifier switch be held conductive, and means included in the synchronous rectifier switch control pulse forming circuit for holding the synchronous rectifier switch nonconductive when the power requirement of the load is less than a predefined limit that is less than a load rating.

The present invention is perhaps best characterized by the synchronous rectifier control circuit which comprises, for determination of the conducting periods of the synchronous rectifier switch: (a) the synchronous rectification period determination capacitor for providing a voltage for determination of periods of time during which the synchronous rectifier switch is to conduct; (b) the first current source connected to the synchronous rectification period determination capacitor for charging the same with a current corresponding to a voltage across the inductance means during the conducting periods of the active switch; and (c) the second current source connected to the synchronous rectification period determination capacitor for permitting the flow of a discharge current corresponding to the DC output voltage. The charge and discharge periods of the synchronous rectification period determination capacitor are therefore accurately determinable in agreement with the energy storage and release periods of the inductance means due to the on/off operation of the active switch. The synchronous rectifier switch may thus be held on during optimal periods of time for enhancement of efficiency as the conducting periods of the synchronous rectifier switch substantially agree with the energy release periods of the inductance means. There will be practically no risk of noise production or circuit destruction due to the concurrent conduction of the synchronous rectifier switch and active switch.

In another preferred embodiment of the invention the synchronous rectification period determination capacitor is charged and discharged under optimum conditions.

In a further preferred embodiment of the invention the synchronous rectification period determination capacitor is charged under optimum conditions.

In a further preferred embodiment of the invention a discharge current for the synchronous rectification period determination capacitor is obtainable exactly as required.

In a further preferred embodiment of the invention the synchronous rectification period determination capacitor is positively prevented from discharge during the conducting periods of the active switch.

In a further preferred embodiment of the invention the periods of time during which the synchronous rectifier switch is to be held conductive are accurately ascertainable.

In a further preferred embodiment of the invention the synchronous rectifier switch control pulse forming circuit is simplified in construction.

In a further preferred embodiment of the invention the synchronous rectifier control circuit is capable of fabrication in the form of an integrated semiconductor circuit as it requires no adjustment.

In a further preferred embodiment of the invention the synchronous rectifier circuit can be composed of a less number of parts, and the transistors and other component parts of the synchronous rectifier control circuit can be made more uniform in performance characteristics, by virtue of the fabrication of the synchronous rectifier control circuit in integrated circuit form.

In a further preferred embodiment of the invention the component parts of the synchronous rectifier circuit are lessened in number by the integration of the synchronous rectifier control circuit, synchronous rectifier switch and rectifying diode.

In a further preferred embodiment of the invention the synchronous rectification period determination capacitor is positively discharged in order to assure agreement between the voltage across this capacitor and the conducting periods of the active switch.

In a further preferred embodiment of the invention the synchronous rectifier switch is not driven under light loading, thereby eliminating power loss from the driving of this switch and enhancing efficiency under light loading.

DESCRIPTION OF THE PREFERRED EMBODIMENTS

Figure 1:
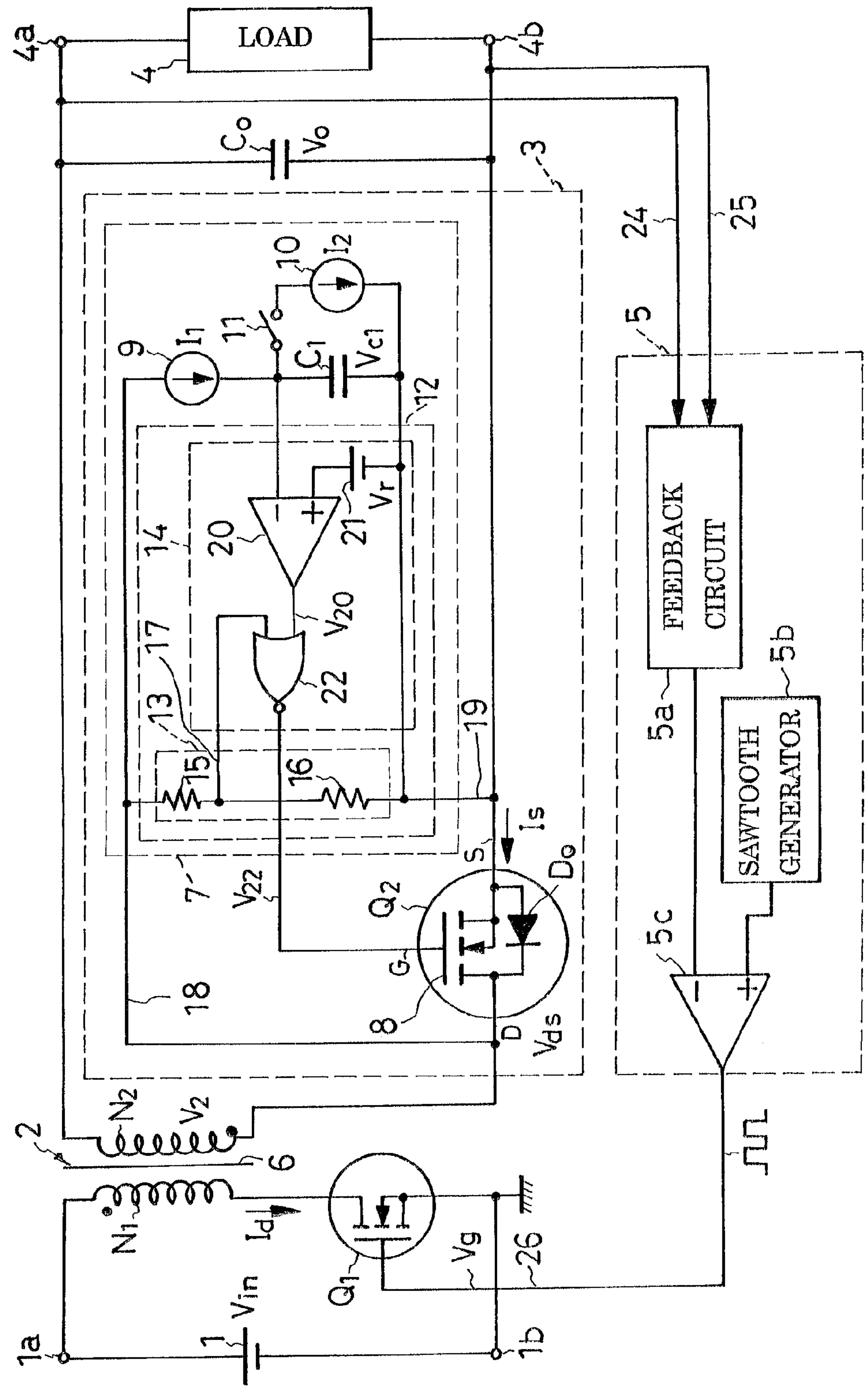
FIG. 1 is a schematic electrical diagram, partly in block form, of the switching-mode power supply embodying the principles of this invention.
Figure 2:
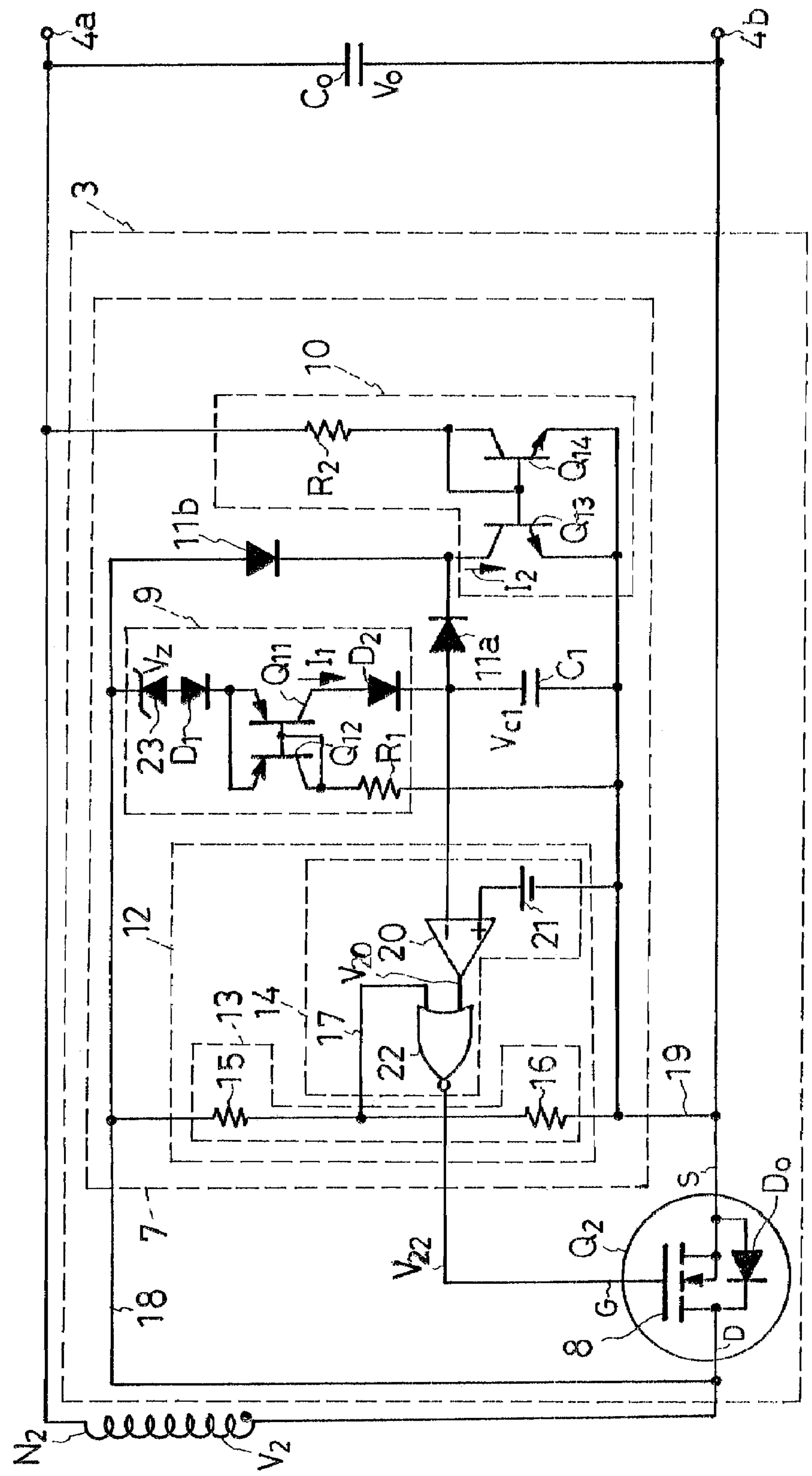
FIG. 2 is a schematic electrical diagram showing in more detail the output side of the transformer in the switching-mode power supply of claim 1.
Figure 3:
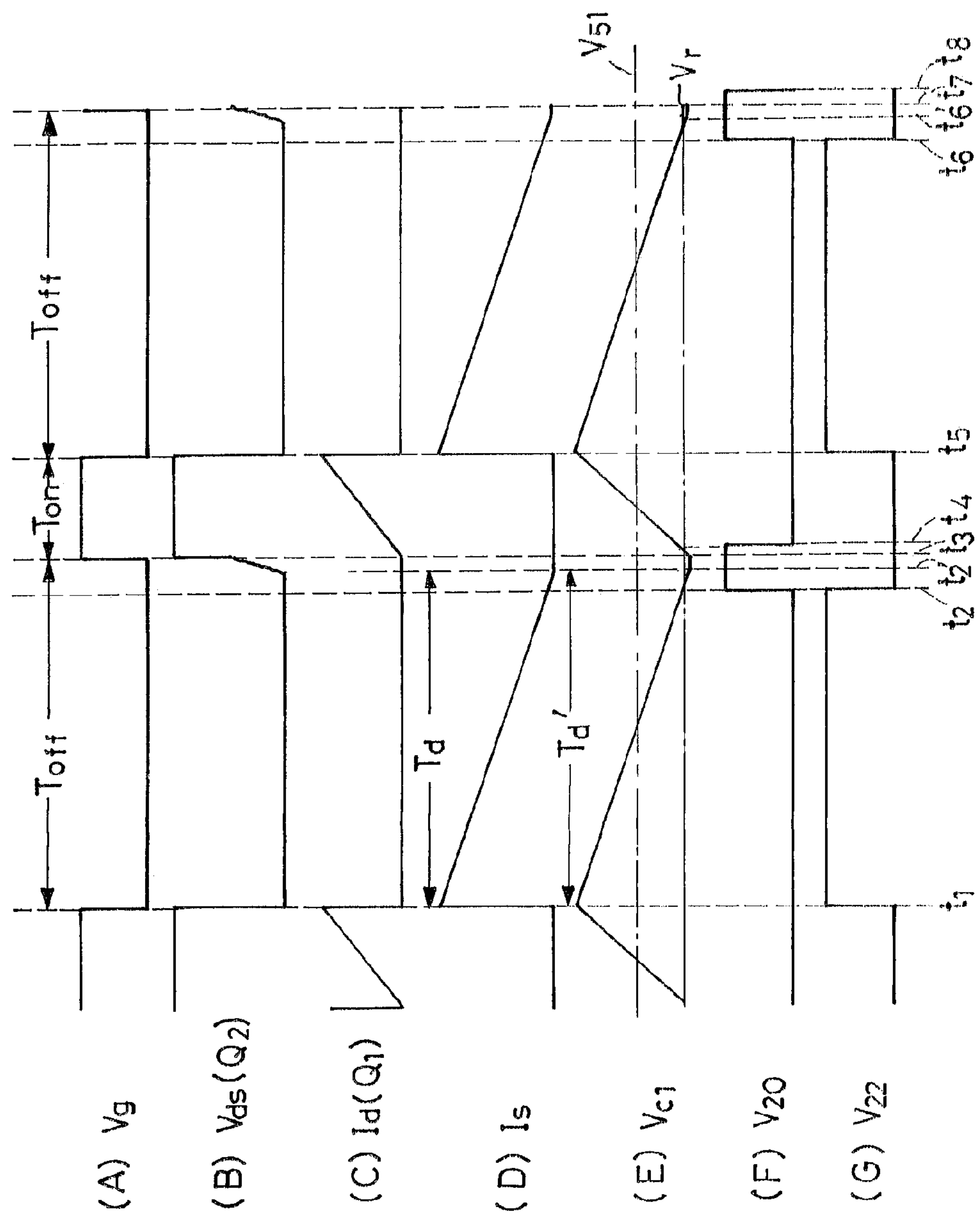
FIG. 3, consisting of (A) through (G), is a diagram of waveforms useful in explaining the operation of the switching-mode power supply of FIGS. 1 and 2.

The present invention is currently believed to be best embodied in the switching-mode power supply of flyback DC-to-DC converter type diagramed in its entirety in FIG. 1 of the above drawings. Reference will also be had to FIGS. 2 and 3 in the course of the following explanation of this first embodiment of the invention. With reference first to FIG. 1 the exemplified flyback DC-to-DC power supply broadly comprises:

1. A pair of DC input terminals $\mathbf{1}_a$ and $\mathbf{1}_b$ as DC input means shown coupled to a source 1 of DC voltage for providing a DC input voltage $V_{in}$.
2. An inductance means herein shown as a transformer 2.
3. An active switch $Q_1$ as switching means for rapidly switching the DC input voltage $V_{in}$ on and off.
4. A synchronous rectifier circuit 3, to which the present invention particularly pertains, on the output side of the transformer 2.
5. A smoothing capacitor $C_o$.
6. A pair of DC output terminals $\mathbf{4}_a$ and $\mathbf{4}_b$ as DC output means shown connected to a load 4 to be powered.
7. An active switch control circuit 5 connected to the control input of the active switch $Q_1$ for controllably driving the same according to the DC output voltage being applied to the load.

The pair of DC input terminals $\mathbf{1}_a$ and $\mathbf{1}_b$ are shown connected to the DC voltage source 1 for inputting the DC input voltage $V_{in}$. In practice the DC voltage source 1 may be either a battery or a rectifier/filter circuit to be connected to a commercial source of AC power.

The transformer 2 has a primary winding $N_1$ and a secondary winding $N_2$, both coiled around a magnetic core 6 and electromagnetically coupled together. As indicated by the dots in FIG. 1, the transformer windings $N_1$ and $N_2$ are oppositely polarized with respect to each other in this particular embodiment. It is understood that the transformer 2 is additionally furnished with a tertiary winding, not shown, for powering the active switch control circuit 5. The transformer primary $N_1$ is connected between the pair of DC input terminals $\mathbf{1}_a$ and $\mathbf{1}_b$ via the active switch $Q_1$. The transformer secondary $N_2$ has one extremity connected both to one terminal of the smoothing capacitor $C_o$ and to one DC output terminal $\mathbf{4}_a$, and the other extremity connected both to the other terminal of the smoothing capacitor $C_o$ and to the other DC output terminal $\mathbf{4}_b$. The transformer windings $N_1$ and $N_2$ have prescribed numbers of turns and inductances for desired performance of this power supply, as will be later discussed in more detail.

Shown as an insulated-gate field-effect transistor (IGFET), the active switch $Q_1$ has a drain as a first main electrode connected to the DC input terminal $\mathbf{1}_a$ via the transformer primary $N_1$, a source as a second main electrode connected to the other input terminal $_b$, which is grounded, and a gate as a control electrode connected to the active switch control circuit 5. Thus, under the direction of a switch control signal $V_g$ from the active switch control circuit 5, the active switch $Q_1$ rapidly turns the DC input voltage on and off for intermittent application to the transformer 2. The active switch $Q_1$ could take the form of some other solid-state switching device such as a bipolar transistor (BT) or an insulated gate bipolar transistor (IGBT).

The synchronous rectifier circuit 3 is broadly divisible into a synchronous rectifier $Q_2$ and a synchronous rectifier control circuit 7. The synchronous rectifier $Q_2$ is also shown as an IGFET, and the synchronous rectifier control circuit 7 takes the form of an integrated semiconductor circuit. In practice the synchronous rectifier $Q_2$ and synchronous rectifier control circuit 7 may be both enveloped in the same package or integrated into one semiconductor chip.

The synchronous rectifier $Q_2$ may be best envisaged as a parallel connection of a synchronous rectifier switch 8 and a diode $D_o$. Constituting the major part of the IGFET, the synchronous rectifier switch 8 has a drain as a first main electrode connected to the transformer secondary $N_2$, a source as a second main electrode connected to the minus output terminal $\mathbf{4}_b$, and a gate as a control electrode connected to the synchronous rectifier control circuit 7. The diode $D_o$ is a parasitic diode of the synchronous rectifier $Q_2$ which is formed in the same semiconductor substrate, as of silicon, as the synchronous rectifier switch 8. This diode could, however, be a discrete part electrically connected in parallel with the synchronous rectifier switch 8. The complete synchronous rectifier $Q_2$ or synchronous rectifier switch 8 might also be some other solid-state switching device such as a BT or IGBT.

In the case where the synchronous rectifier $Q_2$ is of a silicon semiconductor, the voltage drop across the synchronous rectifier switch 8 when it is on is approximately 0.2 volt. The voltage drop across the diode $D_o$ upon its conduction is higher, being approximately 0.8 volt. A less voltage drop and less power loss will occur if the voltage across the transformer secondary $N_2$ is rectified with the synchronous rectifier switch 8 held on than otherwise.

As the name implies, the synchronous rectifier control circuit 7 of the synchronous rectifier circuit 3 makes on/off control of the synchronous rectifier switch 8. It comprises a capacitor $C_1$ for determination of synchronous rectification periods, a first current source 9 for charging the capacitor, a second current source 10 for discharging the capacitor, a switch 11 for preventing the capacitor from discharging, and a synchronous rectifier switch control circuit 12 for creating pulses for driving the synchronous rectifier switch 8.

The first current source 9 is connected between that extremity of the transformer secondary $N_2$ which is connected to the drain of the synchronous rectifier $Q_2$ and one terminal of the synchronous rectification period determination capacitor $C_1$. The second current source 10 is connected in parallel with this capacitor $C_1$ via the discharge inhibit switch 11. The other terminal of the capacitor $C_1$ is connected to the grounded DC output terminal $\mathbf{4}_b$.

The magnitudes of the currents $I_1$ and $I_2$ from the current sources 9 and 10 are so determined in this embodiment of the invention that the discharge period of the synchronous rectification period determination capacitor $C_1$ is approximately equal to the discharge period of the energy stored on the transformer 2. This objective is easily accomplished as the capacitor $C_1$ is charged from the first current source 9 and discharged as dictated by the second current source 10. By being turned on approximately in step with the discharge periods of the capacitor $C_1$, the synchronous rectifier switch 8 will conduct approximately in synchronism with the discharge periods or energy release periods of the transformer 2.

Let it be assumed that the discharge inhibit switch 11 on the discharge path of the synchronous rectification period determination capacitor $C_1$ is turned on only during the nonconducting periods of the active switch $Q_1$. The currents $I_1$ and $I_2$ may then be determined according to the following equation for approximating the discharge period of the capacitor $C_1$ to that of the transformer 2:

$$I_1=[(N_sV_{in})/(N_pV_o)]I_2=(V_2/V_o)I_2 \tag{1}$$

where:

$N_s$=number of turns of the transformer secondary $N_2$;

$N_p$=number of turns of the transformer primary $N_1$;

$V_2$=voltage across the transformer secondary $N_2$.

Assuming, on the other hand, that the discharge inhibit switch 11 is constantly on, then the currents $I_1$ and $I_2$ may be determined as follows for approximating the discharge period of the capacitor $C_1$ to that of the transformer 2:

$$I_1=[(N_sV_{in}+N_pV_o)/N_pV_o]I_2. \tag{2}$$

Operation when the discharge inhibit switch 11 is constantly on will be detailed later with reference to FIG. 10.

Equation (1) is preferred for the following reasons. The energy stored on the transformer 2 during each conducting period of the active switch $Q_1$ is defined as:

$$W_s=(V_{in}^2/2L_p)T_{on}^2 \tag{3}$$

where $W_s$=energy stored on the transformer 2;

$L_p$=inductance of the transformer primary $N_1$;

$T_{on}$=conducting period of the active switch $Q_1$.

The discharge period of the energy $W_s$ from the transformer 2 during the nonconducting period of the active switch $Q_1$ is defined as:

$$T_d=[(N_sV_{in})/(N_pV_o)]T_{on} \tag{4}$$

where $T_d$=discharge period of the transformer 2.

The charge period of the synchronous rectification period determination capacitor $C_1$ is equivalent to the conducting period $T_{on}$ of the active switch $Q_1$. The discharge period of the synchronous rectification period determination capacitor $C_1$ is defined as:

$$T_d'=(V_{c1}\times C)/I_2 \tag{5}$$

where $T_d'$=discharge period of the capacitor $C_1$;

$V_{c1}$=voltage across the capacitor $C_1$;

C=capacitance of the capacitor $C_1$.

The current $I_1$ from the first current source 9 is wholly directed toward the capacitor $C_1$ if the discharge inhibit switch 11 is turned on only during the nonconducting periods $T_{off}$ of the active switch $Q_1$. The voltage $V_{c1}$ across the capacitor $C_1$ is then given by $V_{c1}=(I_1\times T_{on})/C$. A substitution of this definition for $V_{c1}$ in Equation (5) provides:

$$T_d'=(I_1/I_2)T_{on}. \tag{6}$$

Ideally, the ratio $T_{on}/T_d$ of the conducting period $T_{on}$ of the active switch $Q_1$ (or energy storage period of the transformer 2) to the discharge period of the transformer 2 should be equal to the ratio $T_{on}/T_d'$ of the charge period $T_{on}$ of the capacitor $C_1$ to its discharge period $T_d'$. Hence:

$$T_{on}/\{[(N_sV_{in})/(N_pV_o)]T_{on}\}=T_{on}/[(I_1/I_2)T_{on}]. \tag{7}$$

Combining this Equation (7) and the above definition of the first current $I_1$ provides the following equation which is similar to Equation (1):

$$I_1=[(N_sV_{in})/(N_pV_o)]I_2. \tag{8}$$

This formula can be rewritten to express the ratio of the first to the second current as:

$$I_1/I_2=[(N_sV_{in})/(N_pV_o)]=V_2/V_o. \tag{9}$$

Ideal synchronous rectification periods are obtained if the currents $I_1$ and $I_2$ are determined according to Equation (8) or (9).

More specifically, for such ideal synchronous rectification periods, the ratio $I_1/I_2$ may be set at $(N_s\ V_{in})/(N_p\ V_o)$, provided that the turns $N_p$ and $N_s$ of the transformer windings $N_1$ and $N_2$ and the input voltage $V_{in}$ and output voltage $V_o$ are all constant in Equation (1) or (8). Desired synchronous rectification periods are easy to obtain as the currents $I_1$ and $I_2$ are both supplied in constant magnitudes from the current sources 9 and 10. These current sources 9 and 10 will be detailed shortly with reference to FIG. 2.

Shown included in the synchronous rectifier control circuit 7, the synchronous rectifier switch control circuit 12 comprises a conduction period determination circuit 13 as conduction period detect means and a synchronous rectifier switch control pulse forming circuit 14. The conduction period determination circuit 13 provides a signal indicative of the periods of time during which the synchronous rectifier switch 8 is to be held conductive. The switch control pulse forming circuit 14 creates pulses for on-off control of the synchronous rectifier switch 8.

The conduction period determination circuit 13 comprises two voltage-dividing resistors 15 and 16 for ascertaining the nonconducting periods of the active switch $Q_1$ or the periods of time during which the synchronous rectifier switch 8 is to be held conductive in this particular embodiment, and an output conductor 17 connected to the synchronous rectifier switch control pulse forming circuit 14. The voltage-dividing resistors 15 and 16 are interconnected in series between the drain and source of the synchronous rectifier $Q_2$ via conductors 18 and 19 as active switch status means. Connected to the junction between the voltage-dividing resistors 15 and 16, the output conductor 17 applies to the switch control pulse forming circuit 14 a predetermined fraction of the voltage between the drain and source of the synchronous rectifier $Q_2$ as an active switch status signal. The drain-source voltage of the synchronous rectifier $Q_2$ is subject to change with the on/off operation of the active switch $Q_1$, and so is the active switch status signal applied over the output conductor 17 to the synchronous rectifier switch control pulse forming circuit 14.

More specifically, when the active switch $Q_1$ is on, there is impressed to the synchronous rectifier $Q_2$ the sum of the voltage across the transformer secondary $N_1$ and that across the smoothing capacitor $C_o$. This sum voltage is divided by the voltage-dividing resistors 15 and 16, and a relatively high potential develops over the output conductor 17. When the active switch $Q_1$ is off, on the other hand, the synchronous rectifier $Q_2$ is conductive, so that its drain-source voltage and therefore the potential of the output conductor 17 are lower. There is thus input to the synchronous rectifier switch control pulse forming circuit 14 the active switch status signal indicative of whether the active switch $Q_1$ is on or off and whether the synchronous rectifier switch 8 is to be held on or off.

The synchronous rectifier switch control pulse forming circuit 14 has an input connected to the conductor 17 of the conduction period determination circuit 13, another input connected to the synchronous rectification period determination capacitor $C_1$, and an output connected to the control input or gate of the synchronous rectifier switch 8. The synchronous rectifier switch control pulse forming circuit 14 performs the functions of:

1. Ascertaining whether the voltage $V_{c1}$ across the capacitor $C_1$ is higher than a reference value $V_r$.

2. Causing conduction through the synchronous rectifier switch 8 when the capacitor voltage $V_{c1}$ is higher than the reference value $V_r$ and, at the same time, when the active switch status signal indicates that the synchronous rectifier switch 8 be on.

For the performance of the above functions the synchronous rectifier switch control pulse forming circuit 14 comprises a comparator 20, reference voltage source 21, and NOR circuit 22. The comparator 20 has one input connected to the synchronous rectification period determination capacitor $C_1$ and another input to the reference voltage source 21. The reference voltage $V_r$ from this source 21 may be either equal to or slightly above the minimum (ground) potential across the capacitor $C_1$. It is recommended that the value of the reference voltage $V_r$ be set somewhere between zero and 20 percent of the maximum possible value of the capacitor voltage $V_{c1}$ under rated loading.

Comparing the capacitor voltage $V_{c1}$ and reference voltage $V_r$, both indicated at (E) in FIG. 3, the comparator 20 goes high, as from $t_2$ to $t_4$ as at (F) in FIG. 3, when the capacitor voltage $V_{c1}$ is less than the reference voltage $V_r$. The output from the comparator 20 is designated $V_{20}$. The conducting period of the synchronous rectifier switch 8 is from 80 percent to 100 percent, preferably from 90 percent to 100 percent, of the discharge period of the transformer 2.

The NOR circuit 22 of the synchronous rectifier switch control pulse forming circuit 14 has one input connected to the comparator 20 and another to the output conductor 17 of the conduction period determination circuit 13. The NOR circuit 22 goes high when the active switch $Q_1$ is off and at the same time when the comparator 20 is low. FIG. 3 indicates at (A) the active switch control signal $V_g$ as being low from $t_1$ to $t_3$ and from $t_5$ to $t_7$, and at (F) the output $V_{20}$ from the comparator 20 as being low until $t_2$ and from $t_4$ to $t_6$. Therefore, as shown at (G) in FIG. 3, the output $V_{22}$ from the NOR circuit 22 is high from $t_1$ to $t_2$ and from $t_5$ to $t_6$. The synchronous rectifier switch 8 is on during these periods.

It is understood that both comparator 20 and NOR circuit 22 are coupled to a DC source, not shown, to be powered thereby. Further the NOR circuit 22 is understood to have a built-in switch driver circuit, although such a circuit could instead be connected between this NOR circuit and the gate of the synchronous rectifier $Q_2$.

The first current source 9 of the synchronous rectifier control circuit 7 is designed to charge the synchronous rectification period determination capacitor $C_1$ at a rate depending upon the DC input voltage $V_{in}$, or upon the voltage $V_2$ across the transformer secondary $N_2$, during the conducting periods of the active switch $Q_1$. As depicted in detail in FIG. 2, the first current source 9 has a current mirror configuration including two pnp transistors $Q_{11}$ and $Q_{12}$ which have their bases interconnected and connected further to the collector of the second transistor $Q_{12}$. The first transistor $Q_{11}$ has its emitter connected to the drain of the synchronous rectifier $Q_2$ via a diode $D_1$, zener diode 23 and conductor 18, and its collector to the synchronous rectification period determination capacitor $C_1$ via a second diode $D_2$. The second transistor $Q_{12}$ has its emitter connected to the emitter of the first transistor $Q_{11}$ to form a current mirror, and its collector to the source of the synchronous rectifier $Q_2$ via a collector resistor $R_1$ and conductor 19.

The zener diode 23 of the first current source 9 is intended to make the first current $I_1$ proportional to the input voltage $V_{in}$ for establishment of Equation (8). The zener diode 23 has a zener voltage $V_z$ which is equal to the output voltage $V_o$ of the smoothing capacitor $C_o$. The zener voltage $V_z$ is such that there is obtained between first diode $D_1$ and conductor 19 the drain-source voltage $V_{ds}$ ($=V_2+V_o$) of the synchronous rectifier $Q_2$ minus the zener voltage $V_z$. During the conducting periods of the active switch $Q_1$ there is applied to the collector resistor $R_1$ the voltage $V_2$ across the transformer secondary $N_2$ plus the output voltage $V_o$ minus the zener voltage $V_z$ minus the forward voltage $V_F$ of the first diode $D_1$ minus the collector-emitter voltage $V_{CE}$ of the second transistor $Q_{12}$ (i.e., $V_2+V_o-V_z-V_F-V_{CE}$).

If now $V_z=V_o$, then the voltage across the collector resistor $R_1$ is redefined as $V_2-V_F-V_{CE}$. However, both $V_F$ and $V_{CE}$ being negligibly small compared to $V_2$, the voltage across the collector resistor $R_1$ may be thought of as being approximately equal to the transformer secondary voltage $V_2$. The current flowing through the collector resistor $R_1$ is given by $V_2/R_1$. The transformer secondary voltage $V_2$ is proportional to the input voltage $V_{in}$ since $V_2=V_{in}(N_s/N_p)$. The current flowing through the collector resistor $R_1$ is therefore proportional to the input voltage $V_{in}$. As the transistors $Q_{11}$ and $Q_{12}$ provide a current mirror circuit, the current $I_1$ through the collector of the first transistor $Q_{11}$ is equal to that through the first collector resistor $R_1$:

$$I_1=V_2/R_1=V_{in}(N_s/N_p)/R_1. \quad (10)$$

The current $I_1$ is therefore proportional to the input voltage $V_{in}$.

Were it not for the zener diode 23, the voltage impressed to the collector resistor $R_1$ during the conducting periods of the active switch $Q_1$ would be $$V_2+V_o-V_F-V_{CE}.$$

The current through the first collector resistor $R_1$ and the current $I_1$ through the collector of the first transistor $Q_{11}$ are both given by:

$$I_1=(V_2+V_o-V_F-V_{CE})/R_1. \quad (11)$$

Again, both $V_F$ and $V_{CE}$ are negligibly small compared to $V_2$, so that $$I_1=(V_2+V_o)/R_1.$$

Unlike the case where the zener diode 23 is provided, this definition of the current $I_1$ requires to take $V_o$ into consideration in determination of the ratio $I_1/I_2$. It is nevertheless possible to make this determination without the zener diode 23, so that it may be omitted in applications where circuit simplicity is of prime importance.

Connected to the synchronous rectification period determination capacitor $C_1$, the second current source 10 is designed to cause that capacitor to discharge at a rate depending upon the DC output voltage $V_o$. The second current source 10 is also of current mirror configuration comprising two npn transistors $Q_{13}$ and $Q_{14}$ which have their bases interconnected and connected further to the collector of the second transistor $Q_{14}$. The first transistor $Q_{13}$ has its collector connected to the synchronous rectification period determination capacitor $C_1$ via a selective discharge diode $\mathbf{11}_a$, and its emitter connected via the conductor 19 both to the source of the synchronous rectifier $Q_2$ and to the minus DC output terminal $\mathbf{4}_b$. The second transistor $Q_{14}$ has its collector connected to the plus DC output terminal $\mathbf{4}_a$ via a collector resistor $R_1$, and its emitter connected via the conductor 19 both to the source of the synchronous rectifier $Q_2$ and to the minus DC output terminal $\mathbf{4}_b$.

Both selective discharge diode $\mathbf{11}_a$ and bias diode $\mathbf{11}_b$ are provided as in FIG. 2 to perform the same function as the discharge inhibit switch 11, FIG. 1, that is, that of preventing the synchronous rectification period determination capacitor $C_1$ from discharging during the conducting periods of the active switch $Q_1$. Designed to cause conduction through the selective discharge diode $\mathbf{11}_a$ only during the nonconducting periods of the active switch $Q_1$, the bias diode $\mathbf{11}_b$ has its anode connected to the drain of the synchronous rectifier $Q_2$ via the conductor 18, and its cathode to the cathode of the selective discharge diode $\mathbf{11}_a$. The bias diode $\mathbf{11}_b$ is forward biased during the conducting periods of the active switch $Q_1$ by the sum of the output voltage $V_o$ and the voltage $V_2$ across the transformer secondary $N_2$. As a result, the selective discharge diode $\mathbf{11}_a$ has a cathode potential given by $V_2+V_o-V_F$, where $V_F$ is the forward voltage of the bias diode $\mathbf{11}_b$, which potential is higher than the voltage $V_{c1}$ across the synchronous rectification period determination capacitor $C_1$. No discharge occurs.

The collector resistor $R_2$ of the second current source 10 has impressed thereto the output voltage $V_o$ minus the collector-emitter voltage $V_{CE}$ of the second transistor $Q_{14}$. A current will flow through the collector resistor $R_2$ according to $(V_o-V_{CE})/R_2$. The current through the collector resistor $R_2$ can be more simply stated as $V_o/R_2$ since the collector-emitter voltage $V_{CE}$ is negligibly small compared to the output voltage $V_o$. As the transistors $Q_{13}$ and $Q_{14}$ are in current mirror connection, the current $I_2$ through the collector of the first transistor $Q_{13}$ is equal to the collector current of the second transistor $Q_{14}$. The current $I_2$ is therefore defined as $V_o/R_2$. Thus the discharge current of the synchronous rectification period determination capacitor $C_1$ is proportional to the output voltage $V_o$.

In the presence of the zener diode 23 in the first current source 9, the voltages $V_F$ and $V_{CE}$ may be disregarded in defining the ratio between the currents $I_1$ and $I_2$:

$$\begin{aligned} I_1/I_2 &= [V_{in}(N_s/N_p)/R_1]/(V_o/R_2) \\ &= (N_s/N_p)\times(R_2/R_1)\times(V_{in}/V_o) \\ &= [(N_sV_{in})/(N_pV_o)](R_2/R_1) \\ &= (V_2/V_o)(R_2/R_1). \end{aligned} \tag{12}$$

This Equation (12) is equivalent to Equation (9) if $R_1=R_2$. Ideal synchronous rectification periods are easily obtainable in this manner.

In the absence of the zener diode 23 the first current $I_1$ may be expressed as follows according to Equation (11), again by disregarding the voltages $V_F$ and $V_{CE}$:

$$\begin{aligned} I_1 &= (V_2+V_o)/R_1 \\ &= \{[(N_s/N_p)V_{in}]+V_o\}/R_1 \\ &= V_{ds}/R_1 \\ &= (V_2+V_o)/R_1. \end{aligned}$$

Ideally, the ratio $(T_{on}/T_d)$ of the conducting period $T_{on}$ of the active switch $Q_1$ to the energy release period $T_d$ of the transformer 2 should be equal to the ratio $(T_{on}/T_d')$ of the charge period $T_{on}$ of the synchronous rectification period determination capacitor $C_1$ to its discharge period $T_d'$. The relationship between $R_1$ and $R_2$ for establishment of the equation $T_{on}/T_d=T_{on}/T_d'$ is obtainable and definable as follows through the same procedure as that discussed above in conjunction with Equations (7) through (12):

$$R_1=\{1+[(N_sV_{in})/(N_pV_o)]\}R_2. \tag{13}$$

In the absence of the zener diode 23 the input voltage $V_{in}$ and output voltage $V_o$ can both be considered constants in applications where they are constant. Thus the ideal ratio between the collector resistors $R_1$ and $R_2$ is easy to determine.

Reference may be had back to FIG. 1 for the following explanation of the active switch control circuit 5. This circuit 5 creates the pulse-width-modulated switch control signal $V_g$, shown at (A) in FIG. 3, for driving the active switch $Q_1$ so as to keep the DC output voltage constant. Included is a feedback circuit $\mathbf{5}_a$ having inputs connected to the DC output terminals $\mathbf{4}_a$ and $\mathbf{4}_b$ by way of conductors 24 and 25, respectively, for providing an output voltage signal indicative of the voltage being applied to the load 4. The output voltage signal is itself a voltage signal that is in direct proportion with the DC output voltage $V_o$ in this embodiment, although it could be in inverse proportion with the DC output voltage. The feedback circuit $\mathbf{5}_a$ has its output connected to the minus input of a comparator $\mathbf{5}_c$.

Also included in the active switch control circuit 5 is a sawtooth generator $\mathbf{5}_b$ which generates a sawtoothed voltage with a frequency of as high as from 20 kHz to 100 kHz. A triangular wave generator is a possible, obvious alternative to the sawtooth generator $\mathbf{5}_b$. The sawtooth generator $\mathbf{5}_b$ is connected to the plus input of the comparator $\mathbf{5}_c$. The output from this comparator $\mathbf{5}_c$ is the pulse-width-modulated switch control signal $V_g$, which is high when the sawtooth wave is higher than the output voltage signal. The switch control signal $V_g$ is delivered over the conductor 26 to the gate or equivalent control electrode of the active switch $Q_1$. The active switch $Q_1$ is on, designated $T_{on}$ at (A) in FIG. 3, when the switch control signal $V_g$ is high, and off, designated $T_{off}$, when the switch control signal is low. Actually, the pulse-width-modulated switch control signal $V_g$ is impressed between the gate and source of the active switch $Q_1$, but the connection between the comparator $\mathbf{5}_c$ and the source of the active switch $Q_1$ is not shown in FIG. 1.

Although shown connected to the pair of DC output terminals $\mathbf{4}_a$ and $\mathbf{4}_b$ in FIG. 1, the active switch control circuit 5 could instead be connected to the unshown tertiary winding of the transformer 2. Or, for that matter, it might be connected to any parts having a voltage that varies in proportion with the DC output voltage. Optionally, moreover, the feedback circuit may contain an isolation mechanism such as the familiar opto-couplers thereby to be electrically separated from the DC output.

Operation

The DC voltage from the source 1 is applied to the transformer primary $N_1$ during each conducting period of the active switch 1, causing the flow of a current $I_d$ therethrough. The transformer 6 stores energy during each such period because then the switch 8 and diode $D_0$ of the synchronous rectifier $Q_2$ are both nonconductive. Assuming that the smoothing capacitor $C_0$ has been charged, the synchronous rectification period determination capacitor $C_1$ will be charged due to a voltage $V_{ds}$ across the synchronous rectifier $Q_2$ which is equal to the sum of the voltage $V_2$ across the transformer secondary $N_2$ and the voltage $V_o$ from the smoothing capacitor $C_0$ during each conducting period $T_{on}$, as from $t_3$ to $t_5$ in FIG. 3, of the active switch $Q_1$. The voltage $V_{c1}$ across the synchronous rectification period determination capacitor $C_1$ will rise with a gradient during each such period $t_3$-$t_5$.

As has been stated, in the presence of the zener diode 23 as in FIG. 2, the synchronous rectification period determination capacitor $C_1$ will be charged with the first current $I_1$ which has a magnitude in proportion with $V_2+V_o-V_z$. In the absence of the zener diode 23, on the other hand, the capacitor $C_1$ will be charged with the first current $I_1$ which then has a magnitude in proportion with $V_2+V_o$. As indicated at (F) in FIG. 3, the comparator 20 of the synchronous rectifier switch control circuit 12 will go low as at $t_4$ when the capacitor voltage $V_{c1}$ crosses the reference voltage $V_r$.

The active switch $Q_1$ is shown turned off at $t_5$ in FIG. 3 whereupon the energy that has been stored on the transformer 6 will be released. The transformer secondary $N_2$ will have induced thereon a voltage oriented in a direction opposite to that when the active switch $Q_1$ was on. Thereupon, as indicated by the arrow in FIG. 1 and diagramed at (D) in FIG. 3, the current $I_s$ will flow along the path comprising the transformer secondary $N_2$, smoothing capacitor $C_o$, and synchronous rectifier $Q_2$. Containing the diode $D_o$, the synchronous rectifier $Q_2$ will permit the flow of the current $I_s$ therethrough irrespective of whether the switch 8 is on or off.

The charging of the synchronous rectification period determination capacitor $C_1$ of the synchronous rectifier control circuit 7 will terminate when the active switch $Q_1$ is turned off as at $t_1$ and $t_5$ in FIG. 3, because then the drain-source voltage $V_{ds}$ of the synchronous rectifier $Q_2$ will become zero or nearly so. Then the capacitor $C_1$ will start discharging through the second current source 10 with a predetermined time constant. At (E) in FIG. 3 is shown the capacitor voltage $V_{c1}$ as diminishing from $t_1$ to $t_2'$ and from $t_5$ to $t_6'$.

Then, at $t_2$ or $t_6$, when the capacitor voltage $V_{c1}$ crosses the reference voltage $V_r$, the comparator 20 will go high as at (F) in FIG. 3. The NOR circuit 22 will then go low, as at (G) in FIG. 3, thereby causing nonconduction through the synchronous rectifier switch 8. The current $I_s$ will continue flowing through the diode $D_o$ of the synchronous rectifier $Q_2$ after the switch 8 has turned off. The current $I_s$ will keep flowing through the diode $D_o$ for such a brief length of time, and will be of such small magnitude, that in practice there will be no risk of the diode being ruptured.

The advantages gained by the above disclosed first embodiment of the invention may be recapitulated as follows:

1. The synchronous rectification period determination capacitor $C_1$ is charged and discharged under the control of the current sources 9 and 10 having the constant current characteristic. As a result, the ratio between the energy storage and release periods of the transformer 2 due to the on/off operation of the active switch $Q_1$ can be easily and accurately correlated with the ratio between the charge and discharge periods of the capacitor $C_1$, making possible the determination of theoretically ideal conducting periods for the synchronous rectifier switch 8. The close approximation of the conducting periods of the synchronous rectifier switch 8 to the energy release periods of the transformer 2 leads to the maximization of the operating efficiency of the power supply. As an additional, but no less significant advantage, troubles are precluded such as noise production and circuit rupture due to the concurrent conduction of the synchronous rectifier switch 8 and active switch $Q_1$.

2. The currents $I_1$ and $I_2$ can be readily set up in a desired ratio as the associated current sources 9 and 10 are both of current mirror configuration as in FIG. 2.

3. Thanks to the provision of the zener diode 23, FIG. 2, which has the voltage $V_z$ equal to the output voltage $V_o$, ideal conducting periods are determinable for the synchronous rectifier switch 8 by making the collector resistors $R_1$ and $R_2$ equal in value in the case where the output voltage $V_o$ is constant.

4. The synchronous rectification period determination capacitor $C_1$ is prevented from discharge during the conducting periods of the active switch $Q_1$ by both selective discharge diode $\mathbf{11}_a$ and bias diode $\mathbf{11}_b$, FIG. 2.

5. The synchronous rectification period determination capacitor $C_1$ is saved from undesired discharge by the diodes $D_1$ and $D_2$, FIG. 2.

6. Containing no means that demand adjustment, the synchronous rectifier control circuit 7 is easy of fabrication in the form of an integrated circuit.

7. The integration of the synchronous rectifier control circuit 7 not only leads to the reduction of manufacturing costs but to the reliable operation of the current-mirror transistors $Q_{11}$ and $Q_{12}$ as well as $Q_{13}$ and $Q_{14}$ as they are both fabricated on the same semiconductor substrate.

8. The synchronous rectifier circuit 3 is capable of fabrication in one piece as the synchronous rectifier control circuit 7 and synchronous rectifier $Q_2$ are enveloped in the same package.

9. The synchronous rectifier switch 8 has its conducting periods accurately determined by the NOR circuit 22.

Figure 4:
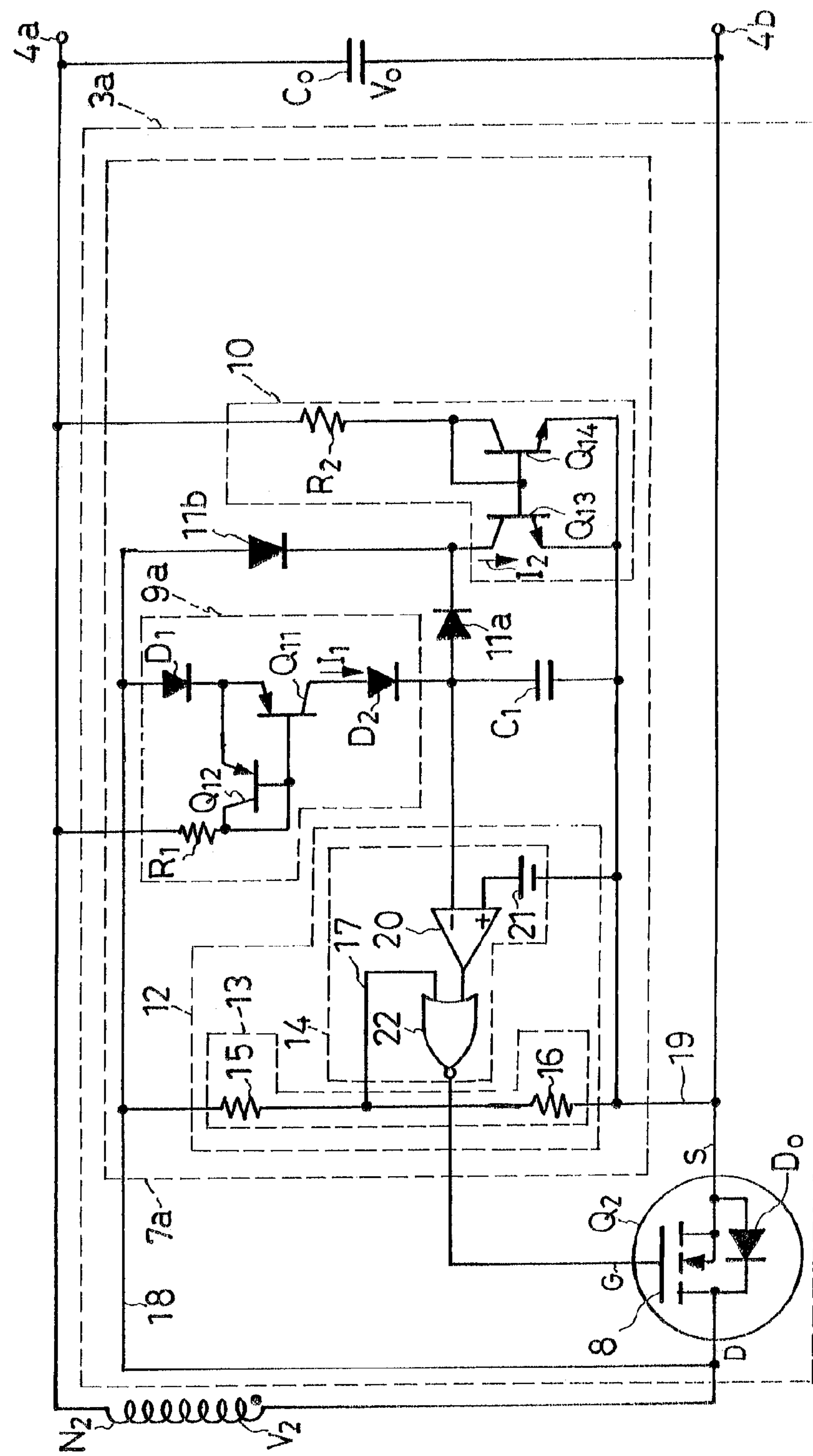
FIG. 4 is a diagram similar to FIG. 2 but showing another preferred form of switching-mode power supply embodying the invention.

Embodiment of FIG. 4

Shown in this figure is a modified synchronous rectifier circuit $\mathbf{3}_a$ which lends itself to use in the switching-mode power supply of FIGS. 1 and 2 in substitution for the first disclosed synchronous rectifier circuit 3 shown in detail in FIG. 2. The modified synchronous rectifier circuit $\mathbf{3}_a$ is itself akin to its FIG. 2 counterpart 3 except for a synchronous rectifier control circuit $\mathbf{7}_a$, which in turn is similar to its FIG. 2 counterpart 7 except for modifications in a first current source $\mathbf{9}_a$. Thus an explanation of the modified first current source $\mathbf{9}_a$ and of its operation will suffice for full disclosure of this second embodiment.

The modified first current source $\mathbf{9}_a$ of the synchronous rectifier control circuit $\mathbf{7}_a$ differs from its FIG. 2 counterpart 9 in having no zener diode and in having the first collector resistor $R_1$ connected between the collector of the second transistor $Q_{12}$ and the transformer secondary $N_2$. So modified, the first current source $9_a$ functions to optimally charge the synchronous rectification period determination capacitor $C_1$ irrespective of variations in the output voltage $V_o$. A reference back to FIG. 2 will reveal that the zener diode 23 of the original first current source 9 has its voltage $V_z$ fixed regardless of the output voltage $V_o$, thereby making it impossible for the capacitor $C_1$ to be charged optimally in the event of output voltage variations. The modified first current source $9_a$ of FIG. 4 optimally feeds the capacitor $C_1$ independently of the output voltage $V_o$, as discussed in more detail hereinbelow.

The voltage $V_2$ across the transformer secondary $N_2$ is impressed to the first collector resistor $R_1$ of the modified first current source $9_a$ via the first diode $D_1$ and second transistor $Q_2$. The current through the first collector resistor $R_1$ may therefore be expressed as $(V_2-V_F-V_{CE})/R_1$. Since the transistors $Q_{11}$ and $Q_{12}$ are in current mirror configuration, the current $I_1$ through the collector of the first transistor $Q_{11}$ is equal to the current through the first collector resistor $R_1$:

$$I_1 = (V_2 - V_F - V_{CE})/R_1$$
$$= [V_{in}(N_2/N_p) - V_F - V_{CE}]/R_1.$$

The forward voltage $V_F$ across the first diode $D_1$ and the collector-emitter voltage $V_{CE}$ of the second transistor $Q_{12}$ are negligibly small compared to the transformer secondary voltage $V_2$. The first current $I_1$ may therefore be more simply redefined as:

$$I_1=V_2/R_1=V_{in}(N_s/N_p)/R_1. \quad (14)$$

According to this Equation (14), which is the same as Equation (10) given above in conjunction with the FIGS. 1 and 2 embodiment, the first current $I_1$ is independent of the output voltage $V_o$. Thus the FIG. 4 embodiment also makes it possible to obtain optimal synchronous rectification periods regardless of output voltage variations. The switching-mode power supply of FIG. 4 construction offers an additional advantage of being less expensive of manufacture because of the absence of a zener diode from the first current source $9_a$.

It will also be appreciated that the ideal relationship between the currents $I_1$ and $I_2$, $I_1/I_2=V_2/V_o$, is obtainable if $R_1=R_2$ in this embodiment too. This embodiment incorporates the second current source 10, selective discharge diode $11_a$, bias diode $11_b$, and synchronous rectifier switch control circuit 12 of the same constructions as their FIG. 2 counterparts designated by the same reference characters, gaining the same associated advantages as set forth in connection with the FIGS. 1 and 2 embodiment.

Figure 5:
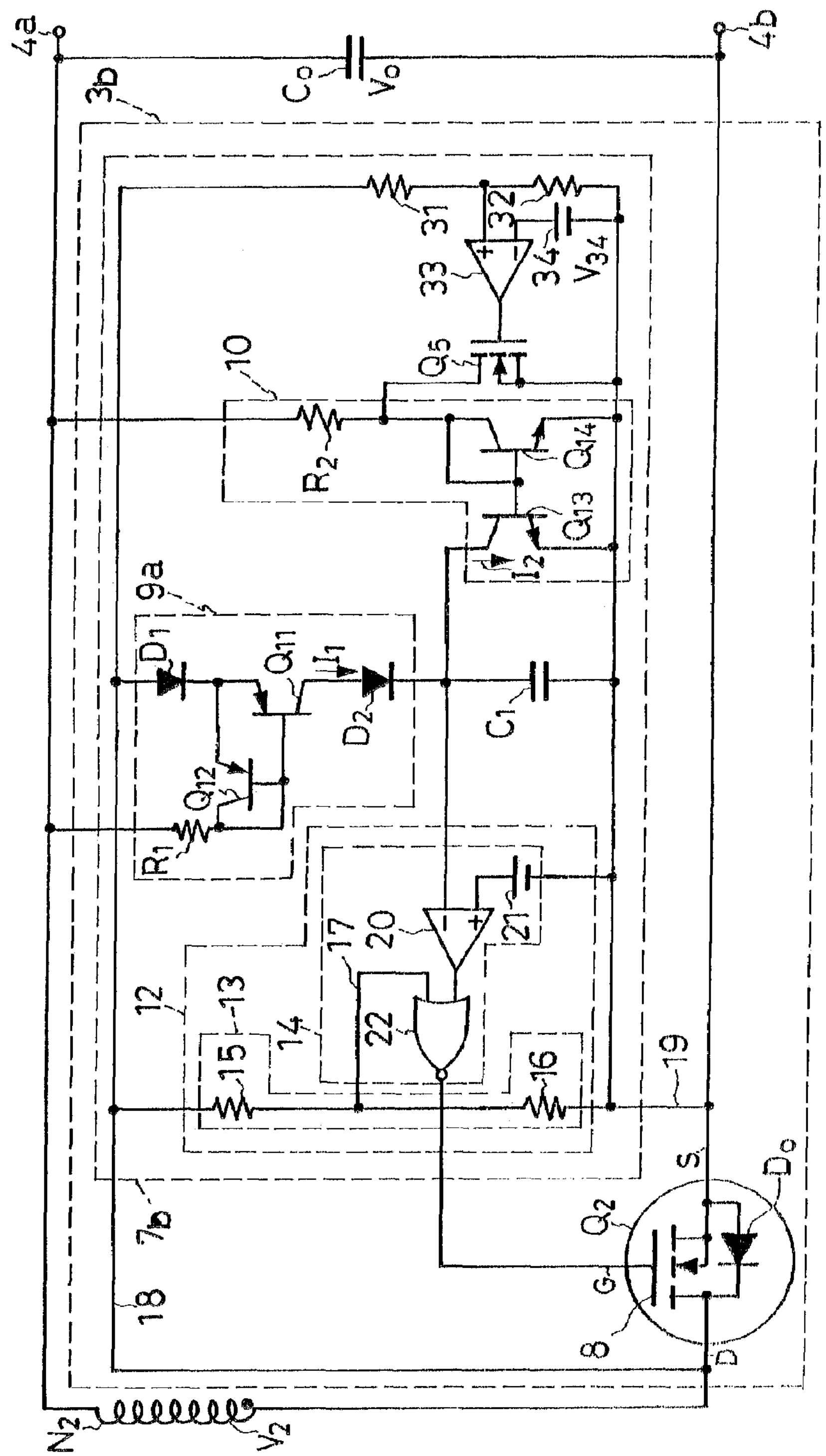
FIG. 5 is a diagram similar to FIG. 2 but showing still another preferred form of switching-mode power supply embodying the invention.

Embodiment of FIG. 5

Another modified synchronous rectifier circuit $3_b$ is incorporated in the embodiment of FIG. 5, which is otherwise identical in construction with that of FIGS. 1 and 2 as well as that of FIG. 4. The second modified synchronous rectifier circuit $3_b$ is similar in construction to the first modified synchronous rectifier circuit $3_a$, FIG. 4, except for a synchronous rectifier control circuit $7_b$. This synchronous rectifier control circuit $7_b$ is akin to its FIG. 4 counterpart $7_a$ except that the selective discharge diode $11_a$ and bias diode $11_b$ of the latter are replaced by discharge inhibit means comprised of two voltage-dividing resistors 31 and 32, comparator 33, reference voltage source 34, and discharge control switch $Q_5$.

Referring more specifically to FIG. 5, the synchronous rectification period determination capacitor $C_1$ is connected directly in parallel with the first transistor $Q_{13}$ of the second current source 10, the selective discharge diode $11_a$ of the foregoing embodiments being absent from this embodiment. The second transistor $Q_{14}$ of the second current source 10 is connected in parallel with the discharge control switch $Q_5$, which is shown as an FET, in order to cause conduction through both transistors $Q_{13}$ and $Q_{14}$ of the second current source 10 only during the nonconducting periods of the active switch $Q_1$, FIG. 1.

In order to ascertain the conducting periods of the active switch $Q_1$, the comparator 33 has its plus input connected to the junction between the voltage-dividing resistors 31 and 32, and its minus input to the reference voltage source 34. The serial circuit of the voltage-dividing resistors 31 and 32 is connected between the drain and source of the synchronous rectifier $Q_2$ via the conductors 18 and 19. Therefore, when the drain-source voltage $V_{ds}$ of the synchronous rectifier $Q_2$ goes high during each conducting period of the active switch $Q_1$, as indicated at (B) in FIG. 3, a high input is applied from between the voltage-dividing resistors 31 and 32 to the plus input of the comparator 33. It is understood that the reference voltage $V_{34}$ from its source 34 is lower than the other input applied as above to the comparator 33 during the conducting periods of the active switch $Q_1$. Thus the comparator 33 goes high when the active switch $Q_1$ is on, and low when it is off.

Having its output connected to the control input, or gate, of the discharge control switch $Q_5$, the comparator 33 causes conduction therethrough during the conducting periods of the active switch $Q_1$. Both transistors $Q_{13}$ and $Q_{14}$ of the second current source 10 are prevented from conduction, and the synchronous rectification period determination capacitor $C_1$ from discharge, upon conduction of the discharge control switch $Q_5$. It is thus seen that the transistors $Q_{13}$ and $Q_{14}$ conduct only during the nonconducting periods of the active switch $Q_1$, permitting the flow of the current $I_2$.

The provision of the voltage-dividing resistors 31 and 32 is not essential because a like signal is obtainable from between the voltage-dividing resistors 15 and 16 of the conduction period determination circuit 13 of the synchronous rectifier switch control circuit 12 for application to the plus input of the comparator 33. Even the comparator 33 itself is eliminable, and the output from the switch control circuit 5, FIG. 1, may instead be directed to the control input of the discharge control switch $Q_5$. In short the discharge control switch $Q_5$ may be under the control of any means capable of causing conduction therethrough during the conducting periods of the active switch $Q_1$.

This embodiment offers the same benefits as does that of FIG. 4 as the discharge control switch $Q_5$ performs the same functions as the selective discharge diode $11_a$ of the FIG. 4 embodiment. The discharge control switch $Q_5$ could be employed in the FIGS. 1 and 2 embodiment in place of the switch 11, FIG. 1, or selective discharge diode $11_a$, FIG. 2.

Figure 6:
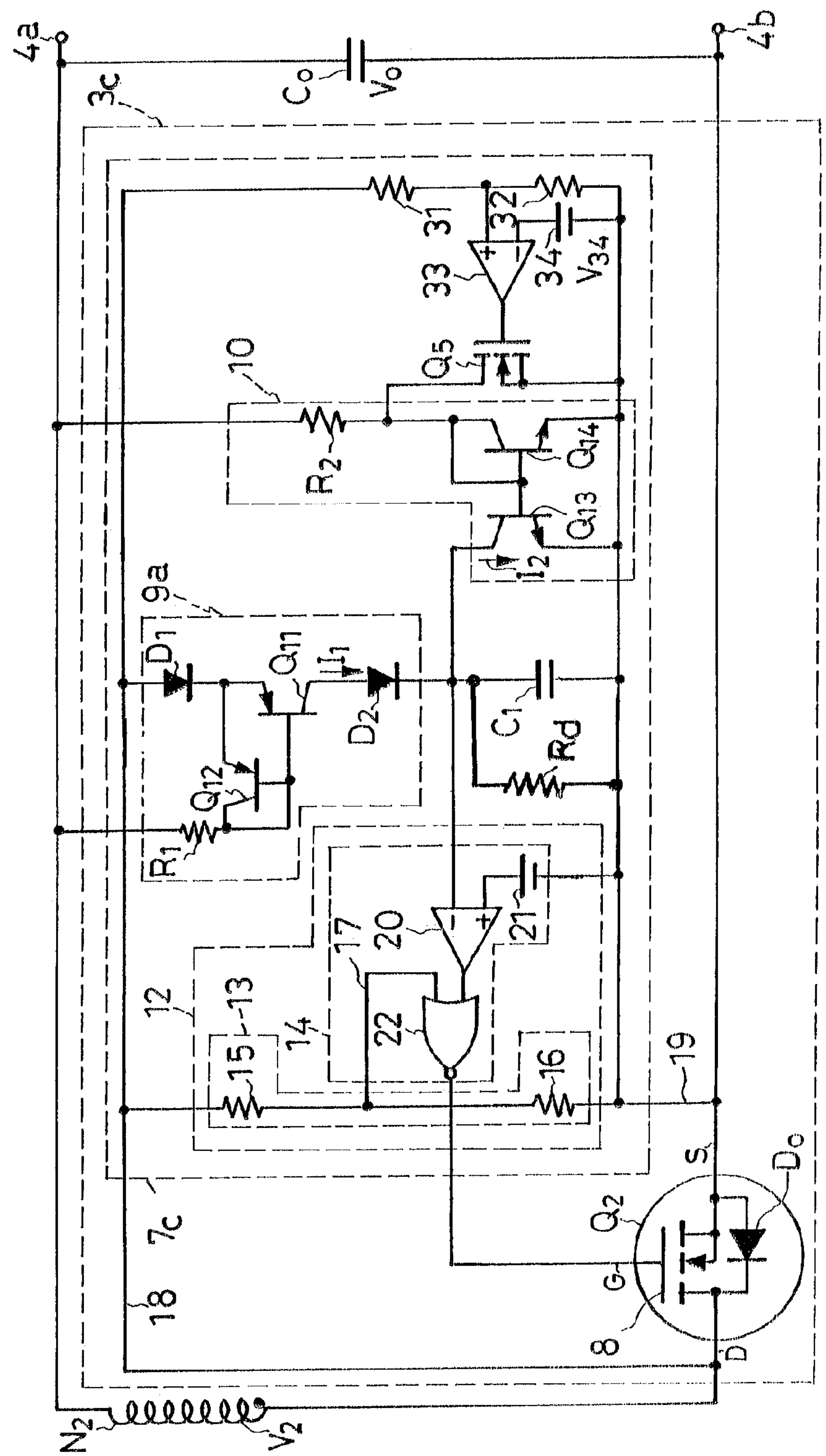
FIG. 6 is a diagram similar to FIG. 2 but showing yet another preferred form of switching-mode power supply embodying the invention.

Embodiment of FIG. 6

Another modified synchronous rectifier circuit $3_c$ presented in FIG. 6 finds use in the switching-mode power supply of FIGS. 1 and 2 in place of its counterpart 3. The synchronous rectifier circuit $3_c$ includes a synchronous rectifier control circuit $7_c$ of the same design as its FIG. 5 counterpart $7_b$ except that a discharge resistor $R_d$ is connected in parallel with the synchronous rectification period determination capacitor $C_1$. The discharge resistor $R_d$ is intended to make sure that the capacitor $C_1$ completes its discharge during the nonconducting periods of the active switch $Q_1$ even in the event of an abnormal drop in the output voltage $V_o$.

As will be noted by referring back to FIG. 1, the output voltage $V_o$ is constantly monitored by the active switch control circuit 5. Now, were it not for the discharge resistor $R_d$, the output voltage $V_o$ might drop inordinately upon impedance shorting of the pair of DC output terminals $4_a$ and $4_b$, because then the switch control circuit 5 would shorten the conducting periods of the active switch $Q_1$. A similar drop in output voltage $V_o$ would also occur when a familiar overcurrent protection device, not shown, was triggered into action. The switch control circuit 5 would respond to such an excessive drop in output voltage $V_o$ by making the conducting periods of the active switch $Q_1$ longer, resulting in a corresponding rise in the peak value of the voltage $V_{c1}$ across the synchronous rectification period determination capacitor $C_1$. Moreover, as a result of the output voltage drop, the base-emitter voltage $V_{BE}$ of the second transistor $Q_{14}$ of the second current source 10 might become not negligible with respect to the lowered output voltage $V_o$. Equation (9) would then no longer hold true, and the capacitor $C_1$ might not complete its discharge within the nonconducting period of the active switch $Q_1$.

No such inconvenience will occur in this FIG. 6 embodiment. With the discharge resistor $R_d$ connected in parallel with the synchronous rectification period determination capacitor $C_1$, a fraction of the discharge current will flow through this resistor in order to keep the capacitor from prolonged discharge. The current through the discharge resistor is defined as $V_{C1}/R_d$, which means that a relatively large amount of current will flow through the discharge resistor $R_d$ when an abnormally long conducting period of the active switch $Q_1$ causes the capacitor $C_1$ to develop a correspondingly high voltage. Normally, however, the capacitor voltage $V_{C1}$ will be so low that the current through the discharge resistor $R_d$ will hardly affect the discharge of the capacitor $C_1$.

Being identical in construction with the FIG. 5 embodiment, this FIG. 6 embodiment gains the same additional advantages therewith. A similar discharge resistor could be connected in parallel with the synchronous rectification period determination capacitor $C_1$ in the FIGS. 1, 2 and 4 embodiments as well.

Figure 7:
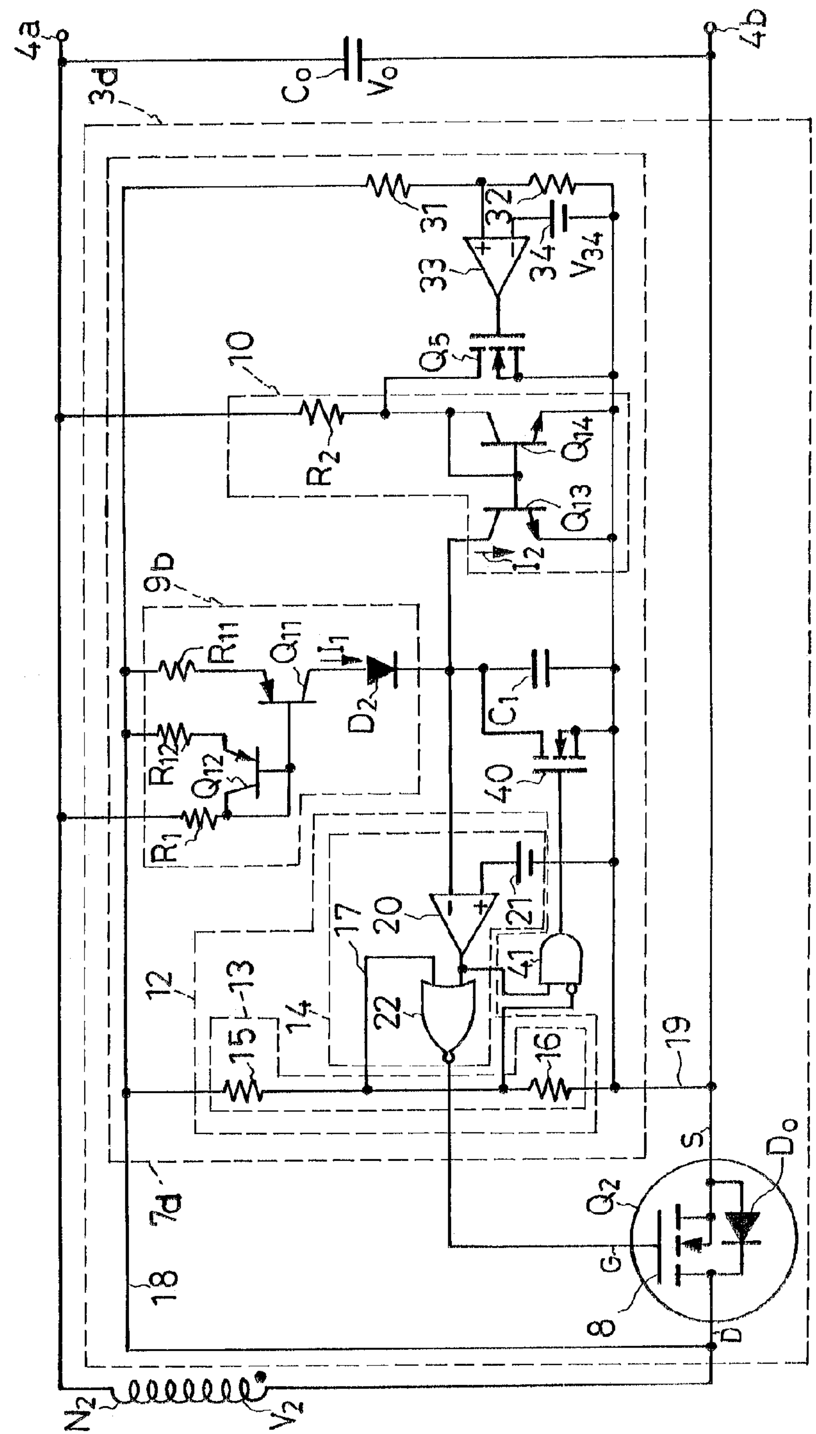
FIG. 7 is a diagram similar to FIG. 2 but showing a further preferred form of switching-mode power supply embodying the invention.

Embodiment of FIG. 7

In FIG. 7 is shown a further modified synchronous rectifier circuit $3_d$, which lends itself to use in the FIGS. 1 and 2 embodiment in substitution for its counterpart 3. The modified synchronous rectifier circuit $3_d$ is itself analogous in construction with its FIG. 5 counterpart $3_b$ except for a modified synchronous rectifier control circuit $7_d$. The modified synchronous rectifier control circuit $7_d$ in turn is similar in construction to its FIG. 5 counterpart $7_b$ except for modifications in a first current source $9_b$ and the addition of a compulsory discharge switch 40 and compulsory discharge logic circuit 41.

The modified first current source $9_b$ of the synchronous rectifier control circuit $7_d$ has a first emitter resistor $R_{11}$ in place of the first diode $D_1$ of the FIG. 5 first current source $9_a$. The second transistor $Q_{12}$ of the first current source $9_b$ has its emitter connected to the drain of the synchronous rectifier $Q_2$ via a second emitter resistor $R_{12}$ and conductor 18. The first current source $9_b$ is similar to its FIG. 5 counterpart $9_a$ in all the other details of construction.

The current $I_1$ through the collector of the first transistor $Q_{11}$ of the first current source $9_b$ during the conducting periods of the active switch $Q_1$ is defined as follows if $V_F$ and $V_{CE}$ are disregarded:

$$I_1=\{R_{12}/[R_{11}(R_{12}+R_1)]\}\times(N_s/N_p)V_{in}.$$

The second current $I_2$ through the collector of the first transistor $Q_{13}$ of the second current source 10 on the other hand is $V_o/R_2$ as in the FIG. 4 embodiment. Consequently, the ratio between the currents $I_1$ and $I_2$ is:

$$I_1/I_2=\{R_{12}R_2/[R_{11}(R_{12}+R_1)]\}\times(N_sV_{in})/(N_pV_o).$$

This equation becomes equivalent to Equation (9) if $R_2=R_{12}/[R_{11}(R_{12}+R_1)]$, making possible the accomplishment of ideal synchronous rectification. The first current source $9_b$ could be employed in lieu of its FIG. 2 counterpart 9 or FIGS. 4-6 counterpart $9_a$.

Shown as an FET, the compulsory discharge switch 40 is connected in parallel with the synchronous rectification period determination capacitor $C_1$. The compulsory discharge logic circuit 41 is shown as an inhibit AND gate which has a noninverting input connected to the comparator 20 of the synchronous rectifier switch control pulse forming circuit 14, an inverting input connected to the junction between the voltage-dividing resistors 15 and 16 of the conduction period determination circuit 13 of the synchronous rectifier switch control circuit 12, and an output connected to the control input or gate of the compulsory discharge switch 40. The inhibit AND gate 41 provides an output of the same state as its noninverting input only when its inverting input is low. An obvious alternative to this inhibit AND gate is a combination of an AND gate and a NOT circuit, with the latter connected between one input of the former and the junction between the voltage-dividing resistors 15 and 16.

Referring once again to FIG. 3, the compulsory discharge logic circuit 41 is high from $t_3$ to $t_4$ when the drain-source voltage $V_{ds}$ of the synchronous rectifier $Q_2$ is low as at (B) whereas the output $V_{20}$ from the comparator 20 is high as at (F). The compulsory discharge switch 40 is therefor on during this period, compulsorily discharging the synchronous rectification period determination capacitor $C_1$. In other words, the capacitor $C_1$ is discharged when the synchronous rectifier $Q_2$ turns off. The capacitor $C_1$ bears no charge at the start of each conducting period $T_{on}$ of the active switch $Q_1$, in which state the capacitor starts to be charged. Exact proportionality is thus assured between the conducting period $T_{on}$ of the active switch $Q_1$ and the amount of the charge on the capacitor $C_1$.

The above compulsory discharge circuit for the synchronous rectification period determination capacitor $C_1$ is provided against a transition from discontinuous to continuous mode of the current through the transformer 2. FIG. 3 is plotted on the assumption that energy discharge from the transformer is completed during the nonconducting periods $T_{off}$ of the active switch $Q_1$. In practice, however, while being driven on and off at a fixed frequency, the active switch $Q_1$ may turn on before completion of energy release from the transformer 2 under certain load conditions, resulting in continuous current flow through the transformer.

Let it now be supposed that the compulsory discharge switch 40 and logic circuit 41 were not provided, and the active switch $Q_1$ turned on while the synchronous rectification period determination capacitor $C_1$ carried some residual charge as from $t_2$ to $t_2'$ in FIG. 3. Then the capacitor $C_1$ would start to be recharged with that residual charge left undischarged. The result would be the loss of concurrence between the energy storage and release periods of the transformer 2 and the charge and discharge periods of the capacitor $C_1$. No ideal synchronous rectification periods would then be expected.

This FIG. 7 embodiments possesses all the benefits of the foregoing embodiments in addition to those accruing from the compulsory discharge circuit discussed above. The same compulsory discharge circuit could, however, be incorporated in the synchronous rectifier control circuit 7, $\mathbf{7}_a$, $\mathbf{7}_b$ and $\mathbf{7}_c$ of FIGS. 1, 2 and 4-6. The same compulsory discharge circuit could also be incorporated in a synchronous rectifier control circuit in which the current sources $\mathbf{9}_b$ and 10, FIG. 7, are replaced by charge and discharge means other than those of current mirror configuration with a constant current characteristic. Aside from the comparator 20, another similar comparator could be employed for connection to one of the inputs of the compulsory discharge logic circuit 41, or the output from the discharge control comparator 33 could be inverted for application to the same input of the logic circuit 41. The other input of the logic circuit 41 could be connected to the junction between the discharge control voltage-dividing resistors 31 and 32 or to the output of the active switch control circuit 5, FIG. 1.

Figure 8:
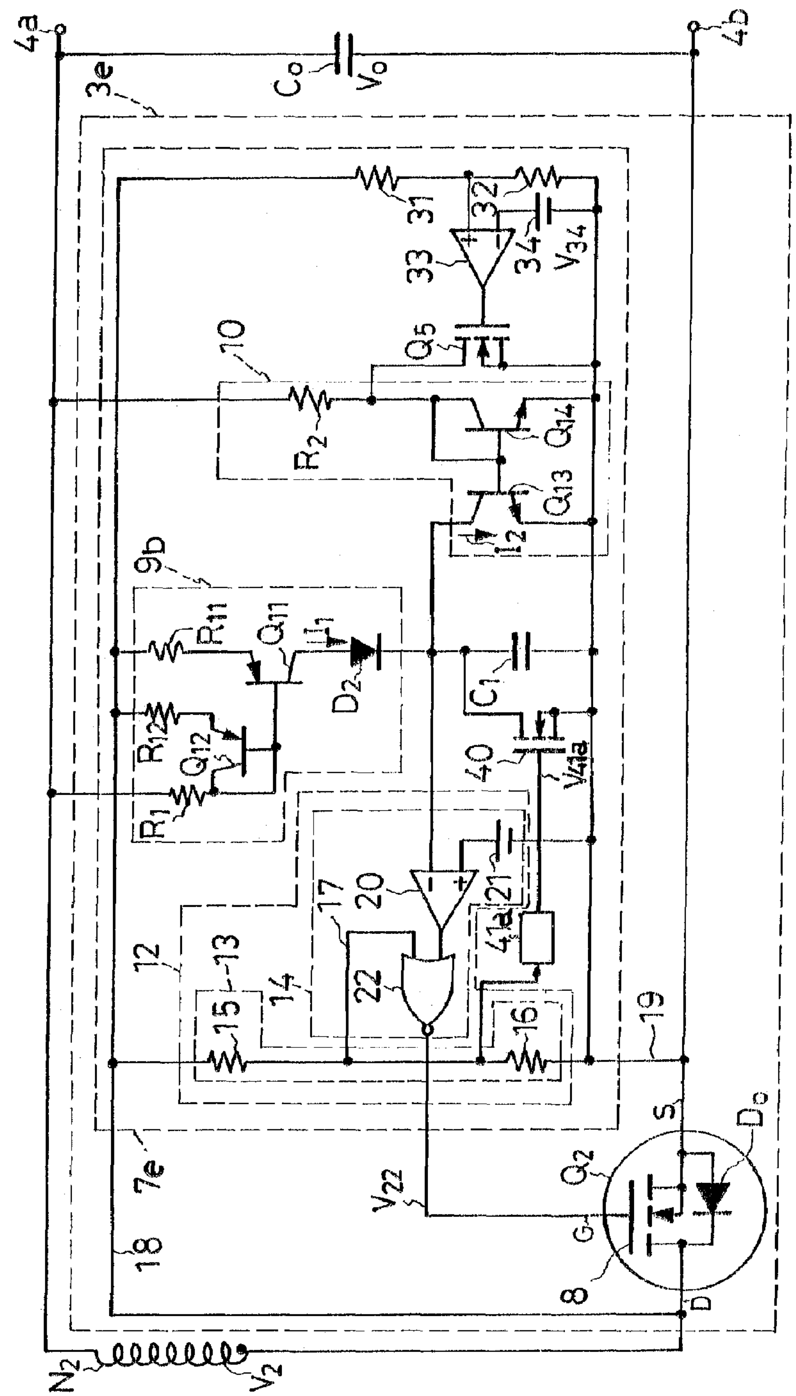
FIG. 8 is a diagram similar to FIG. 2 but showing a further preferred form of switching-mode power supply embodying the invention.
Figure 9:
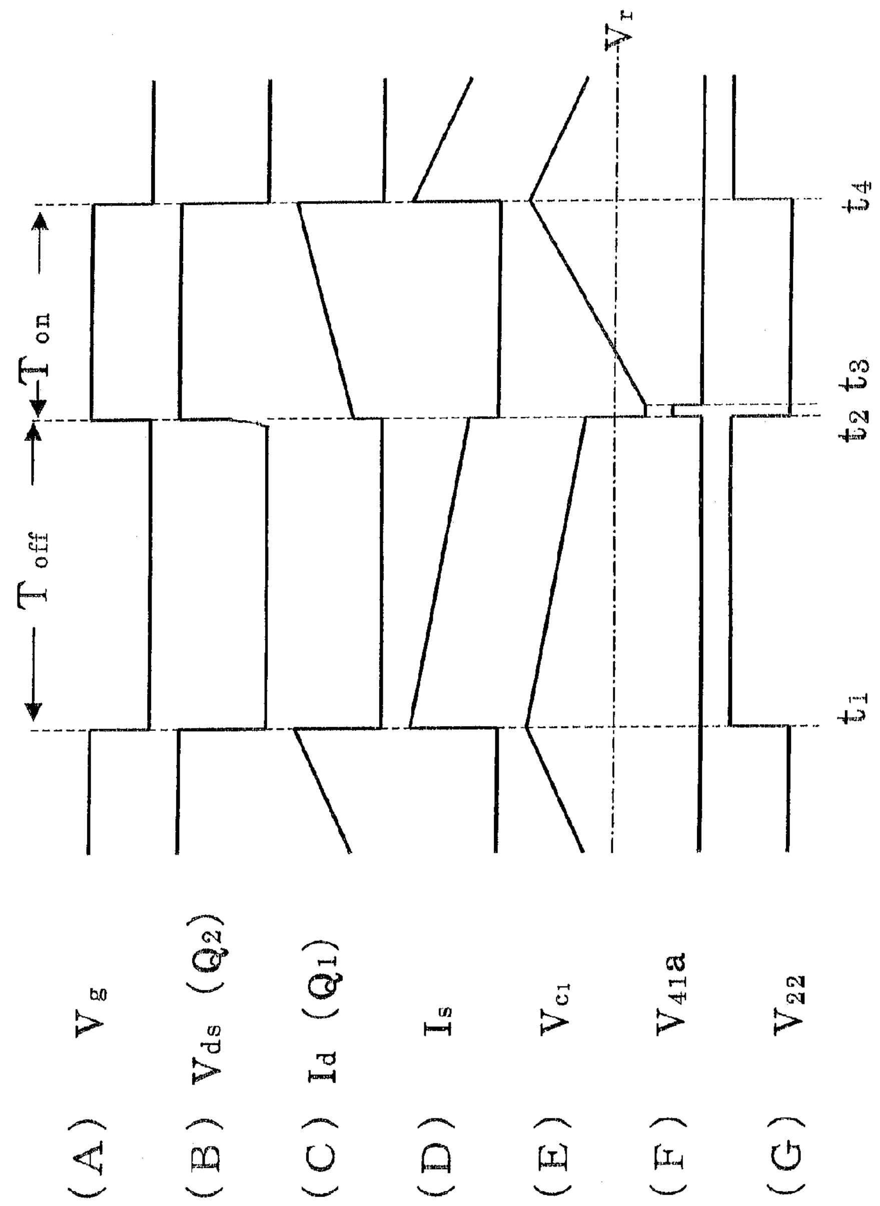
FIG. 9, consisting of (A) through (G), is a diagram of waveforms useful in explaining the operation of the switching-mode power supply of FIG. 8.

Embodiment of FIGS. 8 and 9

A further modified synchronous rectifier circuit $\mathbf{3}_e$ seen in FIG. 8 is capable of substitution for its FIGS. 1 and 2 counterpart 3 or FIG. 7 counterpart $\mathbf{3}_d$. The modified synchronous rectifier circuit $\mathbf{3}_e$ is itself of the same construction as that of FIG. 7 except for a synchronous rectifier control circuit $\mathbf{7}_e$. The synchronous rectifier control circuit $\mathbf{7}_e$ in turn is of the same construction as its FIG. 7 counterpart $\mathbf{7}_d$ except for provision in the former of a compulsory discharge pulse forming circuit $\mathbf{41}_a$ in replacement of the compulsory discharge logic circuit 41 in the latter.

FIG. 9 is a waveform diagram similar to FIG. 3 except (F). At (F) in FIG. 9 is shown the output $V_{41a}$ from the compulsory discharge circuit $\mathbf{41}_a$ of the synchronous rectifier control circuit $\mathbf{7}_e$. Reference may be had to this figure where necessary in the course of the following description of FIG. 8.

The compulsory discharge pulse forming circuit $\mathbf{41}_a$ is designed to deliver a compulsory discharge pulse of very short duration, as from $t_2$ to $t_3$ in FIG. 9, to the compulsory discharge switch 40 at the beginning of each conducting period of the active switch $Q_1$. The compulsory discharge pulse forming circuit $\mathbf{41}_a$ has an input connected to the junction between the voltage-dividing resistors 15 and 16 of the conduction period determination circuit 13 of the synchronous rectifier switch control circuit 12 in order to time its output pulses to the conducting periods of the active switch $Q_1$. In practice the compulsory discharge pulse forming circuit $\mathbf{41}_a$ may take the form of a timer or differentiator which is triggered upon conduction of the active switch $Q_1$. Actuated by each compulsory discharge pulse from the circuit $\mathbf{41}_a$, the compulsory discharge switch 40 will turn on thereby causing the synchronous rectification period determination capacitor $C_1$ to discharge.

The synchronous rectification period determination capacitor $C_1$ is shown at (E) in FIG. 9 as not completing its normal discharge by the end at $t_2$ of one nonconducting period $T_{off}$ of the active switch $Q_1$, the capacitor voltage $V_{C1}$ being then still higher than the reference voltage $V_r$. Even in this case, as the compulsory discharge pulse $V_{41a}$ is applied to the compulsory discharge switch 40, the capacitor voltage $V_{C1}$ will immediately drop below the reference value $V_r$ at the start of the following conducting period $T_{on}$ of the active switch $Q_1$.

The combination of the compulsory discharge switch 40 and pulse forming circuit $\mathbf{41}_a$ taught by this FIG. 8 embodiment could be added to the embodiments of FIGS. 1, 2 and 4-6. The pulse forming circuit $\mathbf{41}_a$ could have its input connected to the junction between the voltage-dividing resistors 31 and 32 of the synchronous rectifier control circuit $\mathbf{7}_e$, or to the output conductor 26, FIG. 1, of the active switch control circuit 5. The current sources $\mathbf{9}_b$ and 10 could be replaced by charge and discharge circuits having no constant current characteristic.

Figure 10:
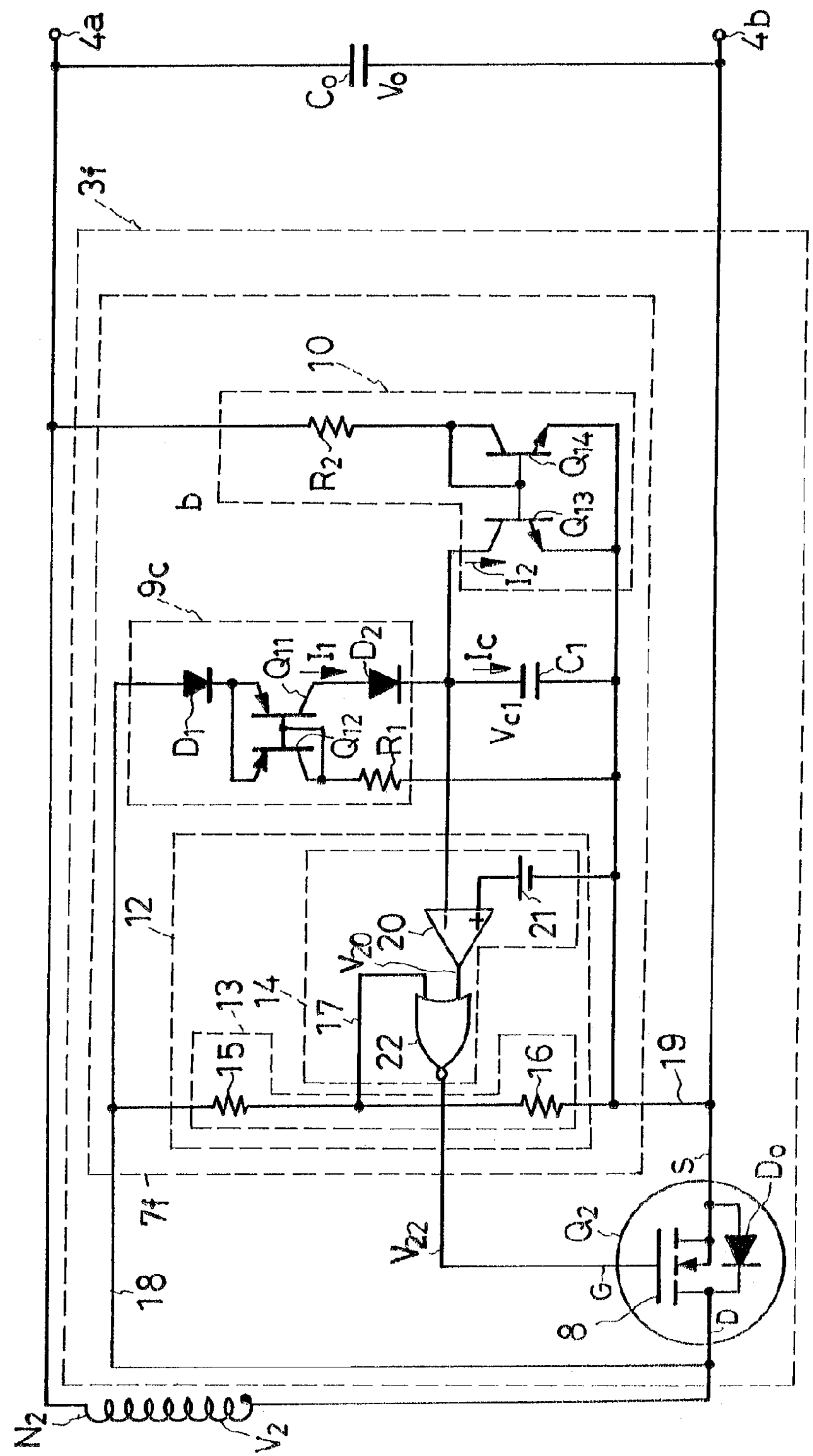
FIG. 10 is a diagram similar to FIG. 2 but showing a further preferred form of switching-mode power supply embodying the invention.

Embodiment of FIG. 10

This embodiment features a further modification $\mathbf{3}_f$ of the synchronous rectifier circuit 3 of FIGS. 1 and 2. The modified synchronous rectifier circuit $\mathbf{3}_f$ is itself identical with its FIGS. 1 and 2 counterpart 3 except for a modified synchronous rectifier control circuit $\mathbf{7}_f$. This modified synchronous rectifier control circuit $\mathbf{7}_f$ in turn is analogous with its FIG. 2 counterpart 7 except for a modified first current source $\mathbf{9}_c$ and the absence of the selective discharge switch $\mathbf{11}_a$ and bias diode $\mathbf{11}_b$.

The modified first current source $\mathbf{9}_c$ of the synchronous rectifier circuit $\mathbf{7}_f$ is of the same construction as that of FIG. 2 except for the absence of the zener diode 23. Further, because of the absence of the selective discharge switch $\mathbf{11}_a$ from the synchronous rectifier circuit $\mathbf{7}_f$, the second current source 10 has its transistor $Q_{13}$ connected directly in parallel with the synchronous rectification period determination capacitor $C_1$.

The current $I_1$ from the first current source $\mathbf{9}_c$ is, as previously discussed in connection with Equation (11), definable as:

$$I_1=(V_2+V_o)/R_1=[(V_{in}N_s/N_p)+V_o]/R_1.$$

The current $I_2$ from the second current source 10 is defined as:

$$I_2=V_o/R_2.$$

Part of the current $I_1$ from the first current source $\mathbf{9}_c$ flows into the second current source 10, so that the current $I_c$ that charges the synchronous rectification period determination capacitor $C_1$ is:

$$I_c=I_1-I_2=\{[(V_{in}N_s/N_p)+V_o]/R_1\}-V_o/R_2.$$

Consequently, if $R_1=R_2$, then $$I_c=(V_{in}N_s/N_p)/R_1. \quad (15)$$

Like the first current $I_1$ defined in Equation (10), the current $I_c$ according to Equation (15) charges the capacitor $C_1$ and, again like the first current $I_1$, is independent of the output voltage $V_o$. In short the following relations exist in the FIG. 10 embodiment:

$$(I_1-I_2)/I_2=I_c/I_2=(V_{ds}-V_o)/V_o=V_2/V_0.$$

Thus the FIG. 10 embodiment gains the same benefits as do the embodiments of FIGS. 4-8. The compulsory discharge switch 40 and associated control means therefor in FIGS. 7 and 8 might be added to this synchronous rectifier circuit $\mathbf{3}_f$.

Figure 11:
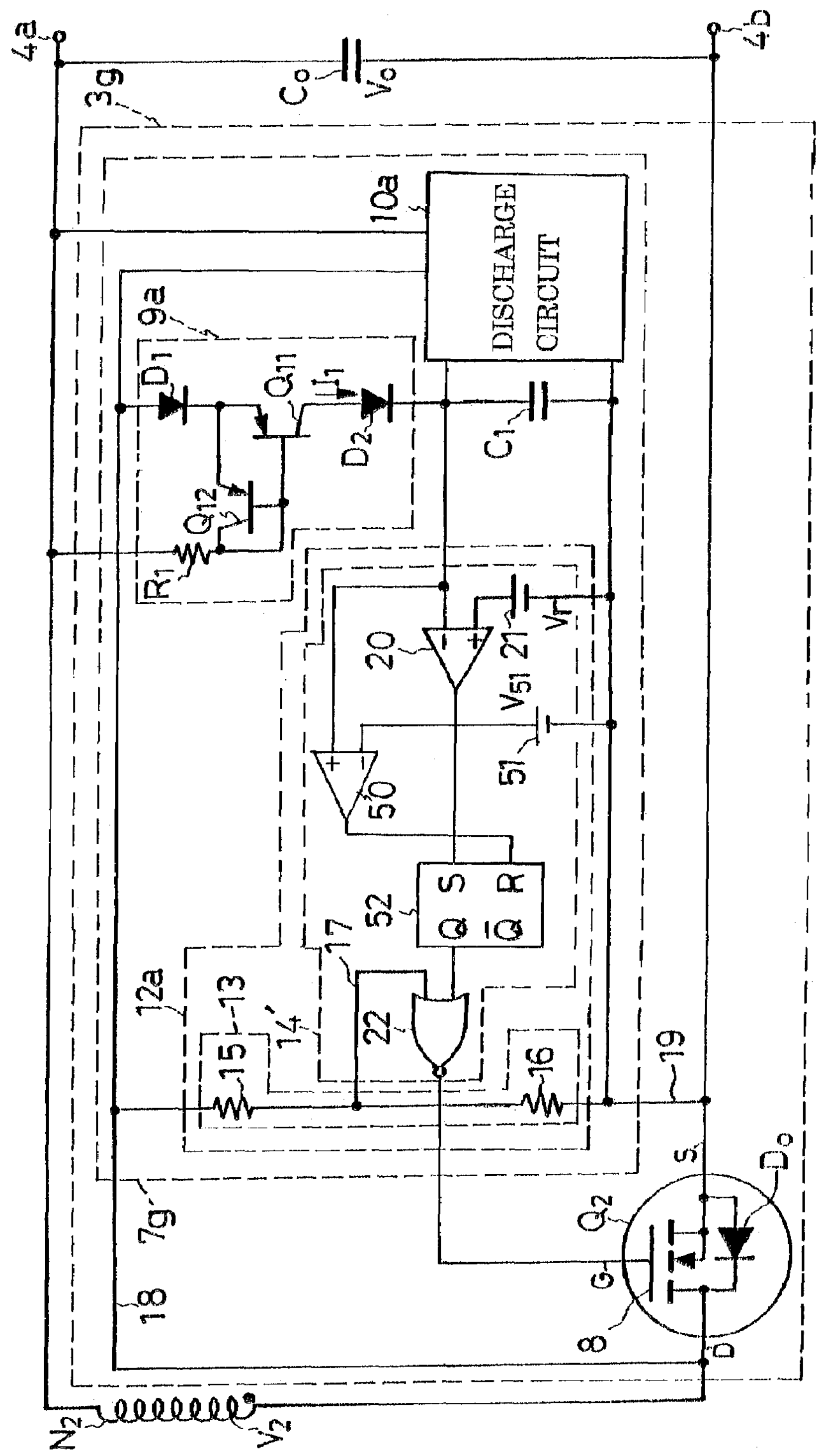
FIG. 11 is a diagram similar to FIG. 2 but showing a further preferred form of switching-mode power supply embodying the invention.

Embodiment of FIG. 11

Here is depicted a further modification $3_g$ of the synchronous rectifier circuit 3 of FIGS. 1 and 2. The modified synchronous rectifier circuit $3_g$ is itself identical with its FIG. 5 counterpart $3_b$ except for a modified synchronous rectifier control circuit $7_g$. This modified synchronous rectifier control circuit $7_g$ in turn is analogous with its FIG. 5 counterpart $7_b$ except for a modified synchronous rectifier switch control circuit $12_a$, which in turn is of the same construction with its FIG. 5 counterpart 12 except for a modified synchronous rectifier switch control pulse forming circuit 14'.

The modified synchronous rectifier switch control pulse forming circuit 14' is of the same make as its FIG. 5 counterpart 14 except for the addition of a comparator 50, reference voltage source 51, and RS flip-flop 52. With the addition of these components to the pulse forming circuit 14', the synchronous rectifier control circuit $7_g$ of this embodiment performs the functions of:

1. Making the synchronous rectifier switch 8 on when the active switch $Q_1$ is off.

2. Finding whether the power requirement of the load 4, FIG. 1, is less than a predetermined level that is less than the rating.

3. Holding the synchronous rectifier switch 8 off when the loading falls below the predetermined level.

The second and third functions above are achieved by the combination of the comparator 50, reference voltage source 51 and flip-flop 52, which are all newly introduced in this embodiment. The inhibition of the driving of the synchronous rectifier switch 8 under light loading imparts higher efficiency to the switching-mode power supply. As has been stated, the driving of the synchronous rectifier switch 8 under normal loading leads to less power loss at the diode $D_o$ on the output side of the transformer secondary $N_2$. Under light loading, however, less current will flow on the secondary side of the transformer than under rated loading, so that the driving of the synchronous rectifier switch 8 will bring about less diminution of power loss. But power loss will occur as the synchronous rectifier switch control pulse forming circuit 14' drives, perhaps via an appropriate switch drive circuit, not shown, the synchronous rectifier switch 8, and at a constant rate regardless of loading. For this reason, under light loading, power loss due to the driving of the synchronous rectifier switch 8 itself will more than offset the reduction of power loss by the synchronous rectifier switch. Hence the inhibition of the driving of the synchronous rectifier switch 8 under light loading.

Referring more specifically to FIG. 11, the comparator 50 of the synchronous rectifier switch control pulse forming circuit 14' has a plus input connected to the synchronous rectification period determination capacitor $C_1$ and a minus input connected to the source 51 of a reference voltage $V_{51}$ representative of the predetermined low loading against which the actual loading is to be compared.

As indicated by the broken line labeled $V_{51}$ at (E) in FIG. 3, the reference voltage $V_{51}$ is intermediate the maximum value of the capacitor voltage $V_{C1}$ under normal loading and the reference voltage $V_r$ from its source 21 and higher than the maximum value of the capacitor voltage $V_{C1}$. Preferably, the reference voltage $V_{51}$ is from five percent to 30 percent of the maximum capacitor voltage $V_{C1}$ under rated loading. Most desirably, the reference voltage $V_{51}$ is equal to the maximum capacitor voltage $V_{C1}$ under such loading that the reduction of power loss by virtue of the driving of the synchronous rectifier switch 8 is equal to the power loss due to the driving of the synchronous rectifier switch itself. The flip-flop 52 has a set input S connected to the comparator 20, a reset input R connected to the comparator 50, and an output Q connected to the NOR circuit 22.

The capacitor voltage $V_{C1}$ depends upon the durations of the conducting periods of the active switch $Q_1$, which shorten with a diminution of the loading. The capacitor voltage $V_{C1}$ is therefore lower under light loading than under normal. When the power requirement of the load becomes so low that the maximum capacitor voltage $V_{C1}$ falls below the reference voltage $V_{51}$, the comparator 50 will remain consistently low, unable to reset the flip-flop 52. This flip-flop will therefore remain set by the comparator 20. The NOR circuit 22 will stay consistently low in response to the consistently high output from the flip-flop 52. Thus is the synchronous rectifier switch 8 left undriven under light loading.

Under normal loading, on the other hand, the comparator 50 will deliver a reset pulse to the flip-flop 52 each time the capacitor voltage $V_{C1}$ crosses the reference voltage $V_{51}$. After being reset, the flop-flop 52 will respond to the output from the comparator 20, so that the synchronous rectifier switch 8 will be driven as in the FIGS. 1 and 2 embodiment. It will be appreciated that the selective driving of the synchronous rectifier switch 8 is accomplished in this embodiment merely by the addition of the comparator 50, flip-flop 52 and reference voltage source 51 to the preexisting parts of the synchronous rectifier switch control pulse forming circuit 14'.

The power requirement of the load 4 connected to the pair of DC output terminals $4_a$ and $4_b$ as in FIG. 1 may be ascertained by means other than those shown in FIG. 11. An example is a means capable of providing a signal that goes low in response to lighter loading, for direct application to the comparator 50. It is even possible to eliminate this comparator 50 altogether and deliver the light load mode signal directly to the reset input R of the flip-flop 52.

As a further modification of the FIG. 11 embodiment, the flip-flop 52 of the synchronous rectifier switch control pulse forming circuit 14' is replaceable by a switch that inhibits the driving of the synchronous rectifier switch 8. Coupled to the power conductor, not shown, of the NOR circuit 22 for example, the optional inhibit switch may be turned on and off by the comparator 50. Alternatively, such an inhibit switch may be connected to the power conductor, not shown, of the aforesaid switch driver circuit through which the NOR circuit 22 is to be coupled to the synchronous rectifier switch 8. This inhibit switch may be turned off under light loading to prevent the switch driver circuit from driving the synchronous rectifier switch 8.

A still further modification of the FIG. 11 embodiment is to provide a hysteretic comparator in place of the comparator 20 of this embodiment, as well as of the FIGS. 1, 2, 4-8 and 10 embodiments and to omit instead the comparator 50, reference voltage source 51 and flip-flop 52. The hysteretic comparator may have its lower trigger level set at the reference voltage $V_r$ seen at (E) in FIG. 3 and its upper trigger level at the other reference voltage $V_{51}$, also seen at (E) in FIG. 3, which is intermediate the first recited reference voltage $V_r$ and the maximum capacitor voltage $V_{C1}$ under normal loading. The reference voltage $V_{51}$ is higher than the maximum capacitor voltage $V_{C1}$ under light loading. The comparator 20 will remain high as long as the capacitor voltage $V_{C1}$ does not build up to the reference voltage $V_{51}$ under light loading. The high comparator output will hold the NOR circuit 22 low thereby preventing the same from driving the synchronous rectifier switch 8.

Thus the embodiments of FIGS. 1, 2, 4-8 and 10 will win the same benefits as does the FIG. 11 embodiment merely by employing a hysteretic comparator in lieu of their nonhysteretic comparator 20. By the "lower trigger level" of the hysteretic comparator is meant the level such that the comparator changes its state when the comparator input drops past that level. The "upper trigger level" on the other hand is such that the comparator changes its state when the comparator input rises past that level.

The discharge circuit $\mathbf{10}_a$ indicated in block form in FIG. 11 is understood to be comprised of the second current source 10, voltage-dividing resistors 31 and 32, comparator 33, reference voltage source 34, and switch $Q_5$, all shown in FIG. 5. The means comprising reference voltage source 51 and flip-flop 52 as in FIG. 11 for inhibiting synchronous rectification under light loading, or any equivalent means, could be incorporated in the embodiments of FIGS. 1, 2, 4, 6-8 and 10.

Figure 12:
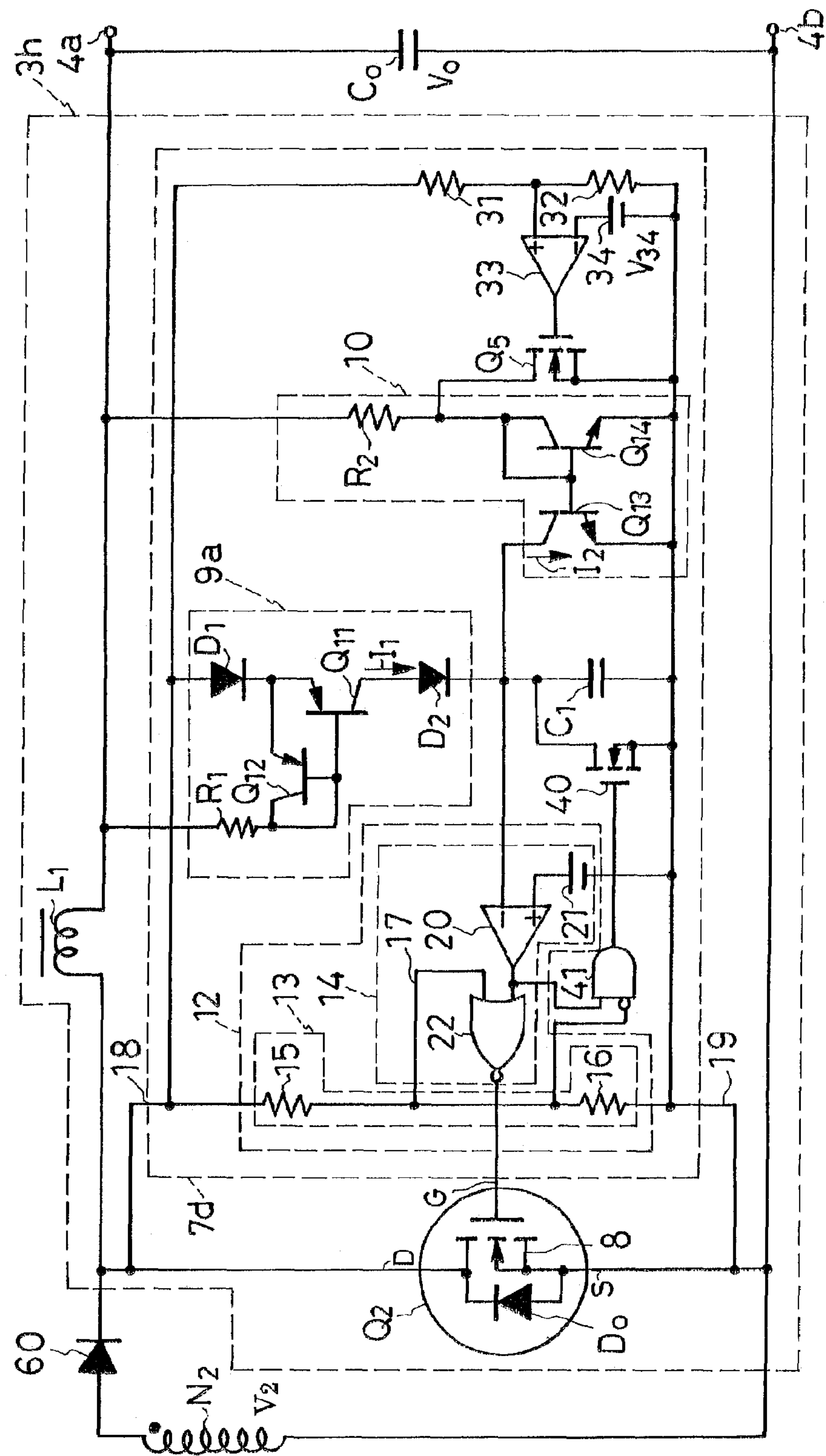
FIG. 12 is a diagram similar to FIG. 2 but showing a further preferred form of switching-mode power supply embodying the invention.

Embodiment of FIG. 12

The output side of the transformer 2 in FIGS. 1 and 2 is modifiable as in FIG. 12. The embodiment shown here represents an adaptation of the switching-mode power supply of FIGS. 1 and 2 to a forward DC-to-DC converter, with the transformer secondary $N_2$ polarized opposite to that of FIGS. 1 and 2. The transformer secondary $N_2$ is connected to the pair of DC output terminals $\mathbf{4}_a$ and $\mathbf{4}_b$ via a rectifying diode 60, a smoothing circuit $\mathbf{3}_h$, and the smoothing capacitor $C_o$. Although shown external to the smoothing circuit $\mathbf{3}_h$, the smoothing capacitor $C_o$ might be considered a part of that circuit $\mathbf{3}_h$.

The smoothing circuit $\mathbf{3}_h$ comprises: (a) an inductor $L_1$ connected in series between transformer secondary $N_2$ and smoothing capacitor $C_o$; (b) the synchronous rectifier $Q_2$ connected in parallel with the serial connection of inductor $L_1$ and smoothing capacitor $C_o$; and (c) the synchronous rectifier control circuit $\mathbf{7}_d$ for controllably driving the synchronous rectifier $Q_2$. The synchronous rectifier $Q_2$ of this embodiment is more commonly called "commutating rectifier," "flywheel rectifier," or "smoothing rectifier" but is here so named for conformity with the naming in the foregoing embodiments.

Itself of the same construction with its counterparts of the foregoing embodiments, the synchronous rectifier $Q_2$ is connected in parallel with the transformer secondary $N_2$ via the rectifying diode 60. The synchronous rectifier control circuit $\mathbf{7}_d$ is equivalent in construction to its FIG. 7 counterpart designated by the same reference characters.

The rectifying diode 60 conducts during the conducting periods of the active switch $Q_1$, so that the inductor $L_1$ stores energy during those periods. The thus stored energy is released from the inductor $L_1$ along the path comprising the smoothing capacitor $C_o$ and synchronous rectifier $Q_2$. The synchronous rectifier $Q_2$ conducts while the energy is being released from the inductor $L_1$ just as the synchronous rectifier conducts while the energy is being released from the transformer 2 in all the previous embodiments. As far as the inductor $L_1$ is concerned, the active switch $Q_1$, transformer 2 and diode 60 constitute means for intermittent voltage application to the inductor.

Being of the same construction as its FIG. 7 counterpart, the synchronous rectifier control circuit $\mathbf{7}_d$ is capable of causing conduction through the synchronous rectifier switch 8 of the synchronous rectifier $Q_2$ approximately in step with energy release from the inductor $L_1$. Optimal driving of the synchronous rectifier switch 8 is thus accomplished for minimal power loss at the smoothing circuit $\mathbf{3}_h$, as discussed in more detail hereinbelow.

The difference between transformer secondary voltage $V_2$ and output voltage $V_o$ is impressed to the inductor $L_1$ during the conducting periods of the active switch $Q_1$. The inductor $L_1$ will then store the energy $[(V_2-V_o)^2/2L]\,T_{on}$ where L is the inductance of the inductor $L_1$. The thus stored energy will be released through the synchronous rectifier $Q_2$ during the subsequent nonconducting period of the active switch $Q_1$ over the period $T_d$ which is defined as:

$$T_d=[(V_2-V_o)/V_o]T_{on}.$$

Both forward voltages $V_F$ of the diodes $D_1$ and $D_2$ and collector-emitter voltages $V_{CE}$ of the transistors $Q_{11}$ and $Q_{12}$ neglected, the synchronous rectification period determination capacitor $C_1$ of the synchronous rectifier control circuit $\mathbf{7}_d$ is charged with the constant first current $I_1$ which is defined as:

$$I_1=(V_2-V_o)/R_1.$$

The maximum voltage $V_{C1}$ of the capacitor $C_1$ is determined by:

$$V_{C1}=(V_2-V_o)T_{on}/(R_1C).$$

The capacitor $C_1$ is discharged during the nonconducting periods of the active switch $Q_1$ with the second current $I_2$:

$$I_2=V_o/R_2.$$

The discharge period $T_d'$ of the capacitor $C_1$ is defined as follows if the resistors $R_1$ and $R_2$ are equal in value:

$$T_d'=C\times V_{C1}/I_2=[(V_2-V_o)/V_o]T_{on}$$

where C and $V_{C1}$ stand for the capacitance and voltage, respectively, of the capacitor $C_1$.

The discharge period $T_d'$ of the synchronous rectification period determination capacitor $C_1$ defined just above is equal to the energy release period $T_d$ of the inductor $L_1$. Optimal driving of the synchronous rectifier switch 8 is therefore attainable as in all the foregoing embodiments merely by making the resistors $R_1$ and $R_2$ equal in value. Generally, there is a continuous current flow through the inductor $L_1$, but since the synchronous rectification period determination capacitor $C_1$ is discharged each cycle by the compulsory discharge switch 40, the capacitor $C_1$ has its charge and discharge periods dependent only upon the variable magnitude of the current flowing through the inductor $L_1$.

The synchronous rectifier control circuit $\mathbf{7}_d$ of this embodiment is replaceable by its FIGS. 1, 4-6, 8, 10 and 11 counterparts 7, $\mathbf{7}_b$, $\mathbf{7}_c$, $\mathbf{7}_e$, $\mathbf{7}_f$ and $\mathbf{7}_g$.

Figure 13:
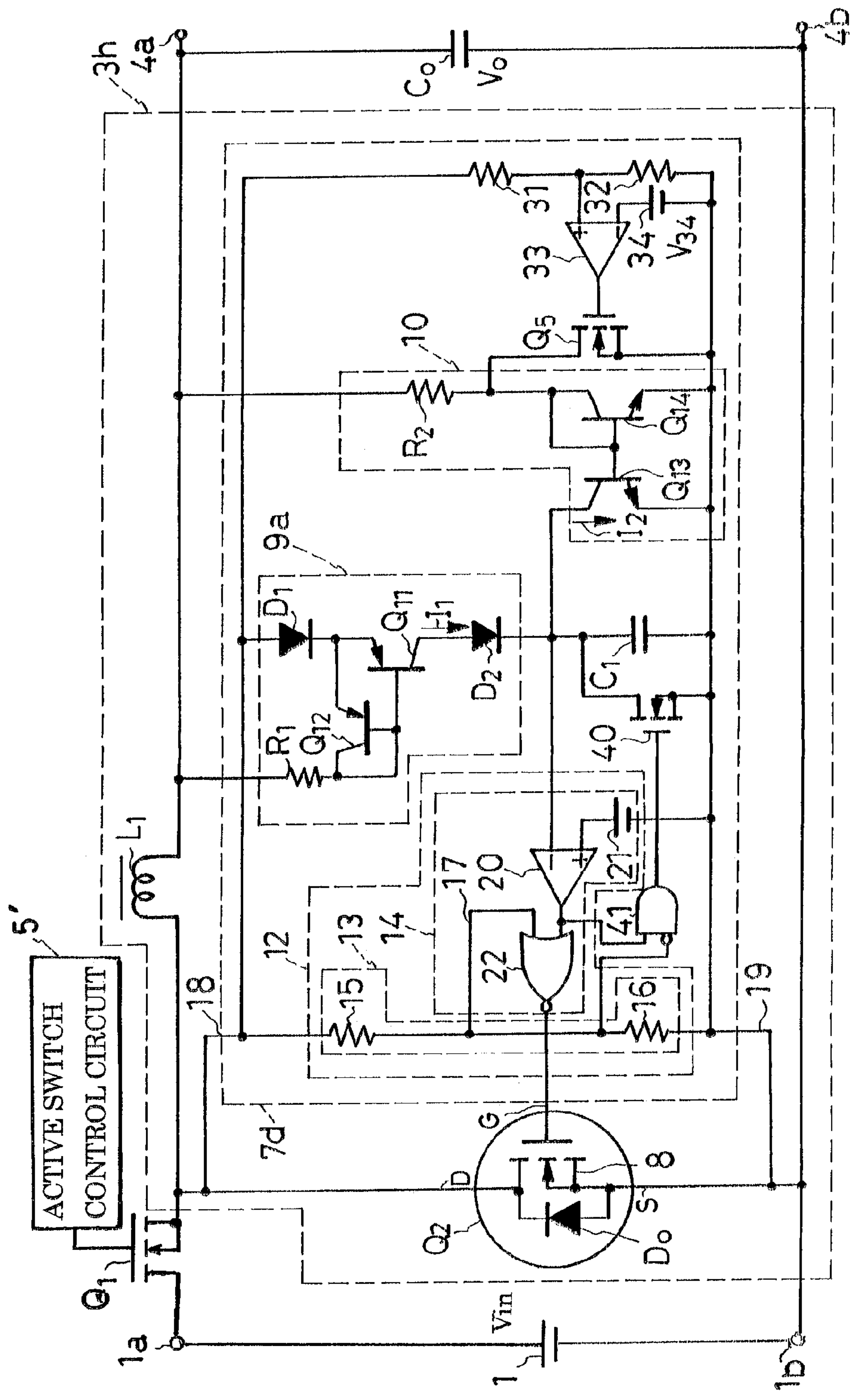
FIG. 13 is a diagram similar to FIG. 2 but showing a still further preferred form of switching-mode power supply embodying the invention.

Embodiment of FIG. 13

Here is an application of the instant invention to a chopper-type switching-mode power supply. This embodiment has no transformer that appears in all the foregoing embodiments, and the active switch $Q_1$ is serially connected between DC input terminal $\mathbf{1}_a$ and DC output terminal $\mathbf{4}_a$ and driven by an active switch control circuit 5'. The active switch $Q_1$ has its output side connected to the pair of DC output terminals $\mathbf{4}_a$ and $\mathbf{4}_b$ via the smoothing circuit $\mathbf{3}_h$ and the smoothing capacitor $C_o$. The smoothing circuit $\mathbf{3}_h$ as well as the synchronous rectifier control circuit $\mathbf{7}_d$ contained therein is of the same construction as that of its FIG. 12 counterpart.

Since this embodiment has no transformer such as seen at 2 in FIG. 1, the DC input voltage $V_{in}$ is input directly to the smoothing circuit $\mathbf{3}_h$ after being switched by the active switch $Q_1$. The smoothing circuit $\mathbf{3}_h$ includes the smoothing inductor $L_1$, as in FIG. 12, to which the DC input voltage $V_{in}$ is directly applied intermittently. The synchronous rectifier switch 8 of the smoothing circuit $\mathbf{3}_h$ operates like its FIG. 12 counterpart 8, the only difference between the two embodiments being that the voltage across the smoothing inductor $L_1$ is applied instead of the transformer secondary voltage $V_2$.

The synchronous rectifier control circuit $\mathbf{7}_d$ of this embodiment is also replaceable by its FIGS. 1, 4-6, 8, 10 and 11 counterparts 7, $\mathbf{7}_b$, $\mathbf{7}_c$, $\mathbf{7}_e$, $\mathbf{7}_f$ and $\mathbf{7}_g$.

Possible Modifications

Figure 14:
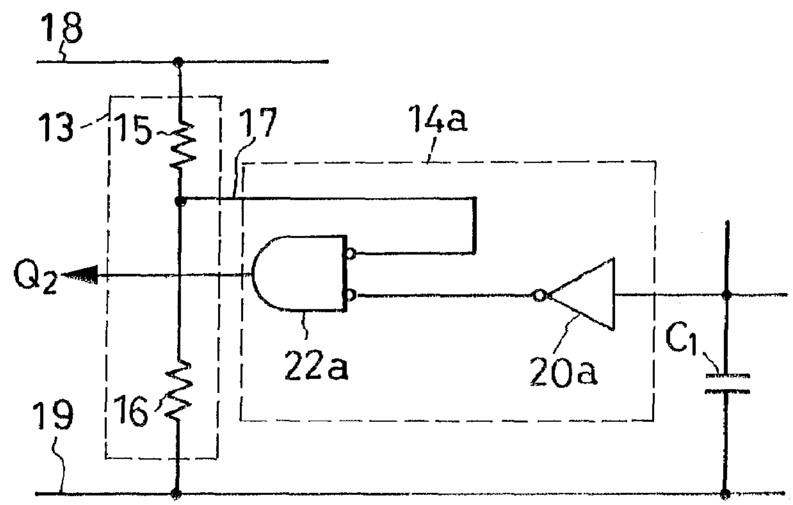
FIG. 14 is a schematic electrical diagram of a modification of the synchronous rectifier switch control circuit in the foregoing preferred embodiments of the invention.

Although the switching-mode power supply according to the present invention has been shown and described hereinbefore in terms of some currently preferred forms, it is not desired that the invention be limited by the exact details of these preferred forms or by the description thereof. The following is a brief list of possible modifications of the illustrated embodiments which are all believed to fall within the purview of the instant invention:

1. The combination of the comparator 20 and reference voltage source 21 in the synchronous rectifier switch control pulse forming circuit 14, FIGS. 1, 2 and 4-13, is replaceable by a NOT circuit $\mathbf{20}_a$ as in a modified pulse forming circuit $\mathbf{14}_a$, FIG. 14. Having a threshold voltage equal to the reference voltage $V_r$, the NOT circuit $\mathbf{20}_a$ of the modified pulse forming circuit $\mathbf{14}_a$ is to translate the voltage $V_{C1}$ across the synchronous rectification period determination capacitor $C_1$ into a binary waveform, providing pulses like those seen at (F) in FIG. 3.

2. The NOR circuit 22 of the pulse forming circuit 14 is also replaceable by an input-inverting AND gate $\mathbf{22}_a$ as in the modified pulse forming circuit $\mathbf{14}_a$ of FIG. 14.

Figure 15:
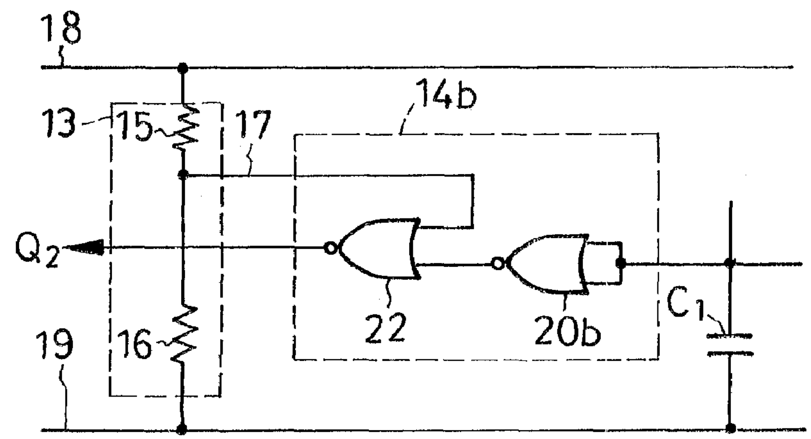
FIG. 15 is a schematic electrical diagram of another modified synchronous rectifier switch control circuit.

3. The combination of the comparator 20 and reference voltage source 21 in the synchronous rectifier switch control pulse forming circuit 14 is also replaceable by a two-input NOR circuit $\mathbf{20}_b$ as in another modified pulse forming circuit $\mathbf{14}_b$, FIG. 15. The NOR circuit $\mathbf{20}_b$ has its two inputs both coupled to the synchronous rectification period determination capacitor $C_1$ thereby performing the functions of a NOT circuit.

Figure 16:
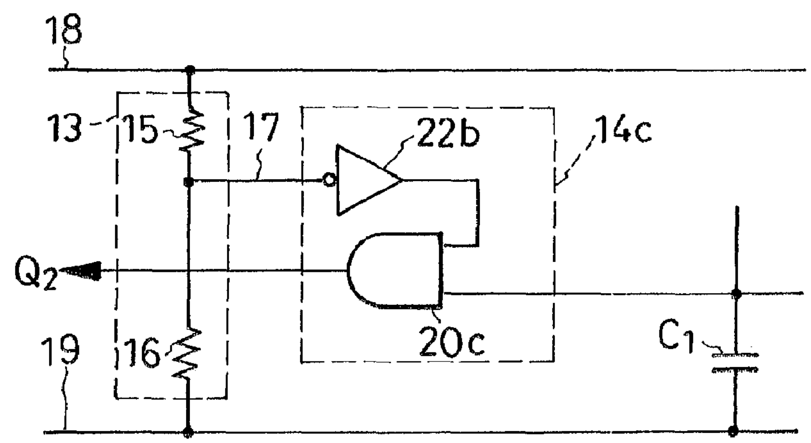
FIG. 16 is a schematic electrical diagram of still another modified synchronous rectifier switch control circuit.

4. The comparator 20, reference voltage source 21 and NOR circuit 22 of the synchronous rectifier switch control pulse forming circuit 14 are replaceable by a combination of a NOT circuit $\mathbf{22}_b$ and AND gate $\mathbf{20}_c$ as in still another modified pulse forming circuit $\mathbf{14}_c$, FIG. 16. The AND gate $\mathbf{20}_c$ has one input connected to the synchronous rectification period determination capacitor $C_1$ and the other input connected to the junction between the voltage-dividing resistors 15 and 16 via the NOT circuit $\mathbf{22}_b$ and conductor 17. Again, having a threshold value equal to the reference voltage $V_r$, FIG. 1, the AND gate $\mathbf{20}_c$ translates the voltage $V_{C1}$ into a binary signal and goes high when both inputs are high.

5. The emitter resistors $R_{11}$ and $R_{12}$, FIGS. 7 and 8, are both omissible.

6. The invention is applicable to other types of switching-mode power supplies such as a DC-to-DC boost converter.

What is claimed is:

1. A switching-mode power supply for DC-to-DC conversion, comprising:

(A) DC input means for inputting a DC voltage;

(B) DC output means for outputting a DC voltage;

(C) inductance means connected between the DC input means and the DC output means;

(D) switching means including an active switch connected between the DC input means and the inductance means for switching the DC input voltage on and off;

(E) an active switch control circuit connected to the active switch for on/off control thereof;

(F) a smoothing capacitor connected between the inductance means and the DC output means;

(G) a synchronous rectifier switch connected in parallel with a serial connection of the inductance means and the smoothing capacitor;

(H) a rectifying diode connected in parallel with the synchronous rectifier switch; and (I) a synchronous rectifier control circuit connected to the synchronous rectifier switch for on/off control thereof, the synchronous rectifier control circuit comprising:

(a) a synchronous rectification period determination capacitor for providing a voltage for determination of periods of time during which the synchronous rectifier switch is to conduct;

(b) a first current source connected to the synchronous rectification period determination capacitor for charging the same with a current corresponding to a voltage across the inductance means during the conducting periods of the active switch;

(c) a second current source connected to the synchronous rectification period determination capacitor for permitting the flow of a discharge current corresponding to the DC output voltage;

(d) active switch status means for providing an active switch status signal indicative of whether the active switch is on or off;

(e) conduction period detect means connected to the active switch status means for providing, in response to the active switch status signal, a signal indicative of periods of time during which the synchronous rectifier switch is to be held conductive; and (f) a synchronous rectifier switch control pulse forming circuit having inputs connected to the synchronous rectification period determination capacitor and the conduction period detect means, and an output connected to the synchronous rectifier switch, for causing conduction through the synchronous rectifier switch when the voltage across the synchronous rectifier period determination capacitor is higher than a prescribed value and at the same time when the signal from the conduction period detect means indicates that the synchronous rectifier switch be held conductive.

2. A switching-mode power supply as defined in claim 1, wherein the inductance means comprises a transformer having a primary winding and a secondary winding electromagnetically coupled together, the primary winding of the transformer being connected to the DC input means via the active switch, the secondary winding of the transformer being connected to the smoothing capacitor, wherein the synchronous rectifier switch is serially inserted in a current path from the secondary winding of the transformer to the smoothing capacitor, and wherein the rectifying diode is so oriented as to be reverse biased by a voltage induced in the secondary winding of the transformer during the conducting periods of the active switch.

3. A switching-mode power supply as defined in claim 1, wherein the switching means comprises:

(a) a primary winding connected to the DC input means via the active switch;

(b) a secondary winding electromagnetically coupled to the primary winding and connected to the smoothing capacitor; and (c) a rectifier serially inserted in a current path from the secondary winding to the smoothing capacitor;

wherein the inductance means comprises a smoothing inductor serially inserted in the current path from the secondary winding to the smoothing capacitor; and wherein the synchronous rectifier switch is connected in parallel with the serial connection of the smoothing inductor and the smoothing capacitor and, via the rectifier, with the secondary winding.

4. A switching-mode power supply as defined in claim 1, wherein the inductance means comprises a smoothing inductor serially inserted in a current path from the DC input means to the smoothing capacitor, wherein the active switch is connected between the DC input means and the smoothing inductor, and wherein the synchronous rectifier switch is connected in parallel with the smoothing capacitor via the smoothing inductor.

5. A switching-mode power supply as defined in claim 1, wherein the synchronous rectifier control circuit further comprises discharge inhibit means for inhibiting the discharge of the synchronous rectification period determination capacitor during the conducting periods of the active switch.

6. A switching-mode power supply as defined in claim 5, wherein the first current source of the synchronous rectifier control circuit provides a first current ($I_1$) for charging the synchronous rectification period determination capacitor during the conducting periods of the active switch, wherein the second current source of the synchronous rectifier control circuit provides a second current ($I_2$) for causing the synchronous rectification period determination capacitor to discharge during the nonconducting periods of the active switch, and wherein the ratio ($I_1/I_2$) of the first to the second current is equal to the ratio $[(V_2+V_o)/V_o]$ of a voltage ($V_2$) across the inductance means during the conducting periods of the active switch plus DC output voltage ($V_o$) to the DC output voltage ($V_o$).

7. A switching-mode power supply as defined in claim 5, wherein the first current source of the synchronous rectifier control circuit provides a first current ($I_1$) for charging the synchronous rectification period determination capacitor during the conducting periods of the active switch, wherein the second current source of the synchronous rectifier control circuit provides a second current ($I_2$) for causing the synchronous rectification period determination capacitor to discharge during the nonconducting periods of the active switch, and wherein the ratio ($I_1/I_2$) of the first to the second current is equal to the ratio $[(V_{ds}-V_z)/V_o]$ of a voltage ($V_{ds}$) across the synchronous rectifier switch during the conducting periods of the active switch minus a predefined voltage ($V_z$) to the DC output voltage ($V_o$).

8. A switching-mode power supply as defined in claim 5, wherein the first current source of the synchronous rectifier control circuit provides a first current ($I_1$) for charging the synchronous rectification period determination capacitor during the conducting periods of the active switch, wherein the second current source of the synchronous rectifier control circuit provides a second current ($I_2$) for causing the synchronous rectification period determination capacitor to discharge during the nonconducting periods of the active switch, and wherein the ratio ($I_1/I_2$) of the first to the second current is equal to the ratio ($V_2/V_o$) of a voltage ($V_2$) across the inductance means during the conducting periods of the active switch to the DC output voltage ($V_o$).

9. A switching-mode power supply as defined in claim 5, wherein the first current source of the synchronous rectifier control circuit supplies a first current ($I_1$) to both the synchronous rectification period determination capacitor and the second current source during the conducting periods of the active switch, wherein the second current source of the synchronous rectifier control circuit provides a second current ($I_2$) for causing the synchronous rectification period determination capacitor to discharge during both conducting and nonconducting periods of the active switch, and wherein the ratio $[(I_1-I_2)/I_2]$ of the first current minus the second current to the second current is equal to the ratio $[(V_{ds}-V_o)/V_o]$ of a voltage ($V_{ds}$) across the synchronous rectifier switch during the conducting periods of the active switch minus the DC output voltage ($V_o$) to the DC output voltage ($V_o$).

10. A switching-mode power supply as defined in claim 1, wherein the first and the second current source of the synchronous rectifier control circuit are both current mirrors.

11. A switching-mode power supply as defined in claim 6, wherein the first current source of the synchronous rectifier control circuit comprises:

(a) a first transistor having an emitter connected to the synchronous rectifier switch and a collector connected to the synchronous rectification period determination capacitor of the synchronous rectifier control circuit;

(b) a second transistor having an emitter connected to the emitter of the first transistor of the first current source and a base and a collector both connected to a base of the first transistor of the first current source; and (c) a collector resistor connected between the collector of the second transistor of the first current source and the synchronous rectifier switch.

12. A switching-mode power supply as defined in claim 7, wherein the first current source of the synchronous rectifier control circuit comprises:

(a) a first transistor having an emitter connected to the synchronous rectifier switch and a collector connected to the synchronous rectification period determination capacitor of the synchronous rectifier control circuit;

(b) a second transistor having an emitter connected to the emitter of the first transistor of the first current source and a base and a collector both connected to a base of the first transistor of the first current source;

(c) a collector resistor connected between the collector of the second transistor of the first current source and the synchronous rectifier switch; and (d) a zener diode connected between the synchronous rectifier switch and the emitter of the first transistor of the first current source, the zener diode having a zener voltage equal to the DC output voltage.

13. A switching-mode power supply as defined in claim 8, wherein the first current source of the synchronous rectifier control circuit comprises:

(a) a first transistor having an emitter connected to the synchronous rectifier switch and a collector connected to the synchronous rectification period determination capacitor of the synchronous rectifier control circuit;

(b) a second transistor having an emitter connected to the emitter of the first transistor of the first current source and a base and a collector both connected to a base of the first transistor of the first current source; and (c) a collector resistor having one extremity connected to the collector of the second transistor of the first current source and another extremity connected to the DC output means.

14. A switching-mode power supply as defined in claim 1, wherein the second current source of the synchronous rectifier control circuit comprises:

(a) a first transistor having an emitter connected to the smoothing capacitor and a collector connected to the synchronous rectification period determination capacitor of the synchronous rectifier control circuit;

(b) a second transistor having an emitter connected to the smoothing capacitor and a base and a collector both connected to a base of the first transistor of the second current source; and (c) a collector resistor connected between the smoothing capacitor and the collector of the second transistor of the second current source.

15. A switching-mode power supply as defined in claim 14, wherein the synchronous rectifier control circuit further comprises discharge inhibit means for inhibiting the discharge of the synchronous rectification period determination capacitor of the synchronous rectifier control circuit during the conducting periods of the active switch, the discharge inhibit means comprising:

(a) a selective discharge diode connected between the synchronous rectification period determination capacitor of the synchronous rectifier control circuit and the collector of the first transistor of the second current source; and (b) a bias diode connected between the synchronous rectifier switch and the collector of the first transistor of the second current source.

16. A switching-mode power supply as defined in claim 14, wherein the synchronous rectifier control circuit further comprises discharge inhibit means for inhibiting the discharge of the synchronous rectification period determination capacitor of the synchronous rectifier control circuit during the conducting periods of the active switch, the discharge inhibit means comprising:

(a) a discharge inhibit switch connected in parallel with the second transistor of the second current source; and (b) a discharge inhibit control circuit for turning the discharge inhibit switch on during the conducting periods of the active switch.

17. A switching-mode power supply as defined in claim 9, wherein the first current source of the synchronous rectifier control circuit comprises:

(a) a first transistor having an emitter connected to the synchronous rectifier switch and a collector connected to the synchronous rectification period determination capacitor of the synchronous rectifier control circuit;

(b) a second transistor having an emitter connected to the emitter of the first transistor of the first current source and a base and a collector both connected to a base of the first transistor of the first current source; and (c) a collector resistor connected between the collector of the second transistor of the first current source and the synchronous rectifier switch; and wherein the second current source comprises:

(a) a first transistor having an emitter connected to the smoothing capacitor and a collector connected to the synchronous rectification period determination capacitor of the synchronous rectifier control circuit;

(b) a second transistor having an emitter connected to the smoothing capacitor and a base and a collector both connected to a base of the first transistor of the second current source; and (c) a collector resistor connected between the smoothing capacitor and the collector of the second transistor of the second current source.

18. A switching-mode power supply as defined in claim 1, wherein the synchronous rectifier control circuit further comprises a discharge adjustment resistor connected in parallel with the synchronous rectification period determination capacitor.

19. A switching-mode power supply as defined in claim 1, wherein the active switch status means of the synchronous rectifier control circuit is connected to the synchronous rectifier switch for obtaining the active switch status signal from a voltage across the synchronous rectifier switch.

20. A switching-mode power supply as defined in claim 1, wherein the synchronous rectifier switch control pulse forming circuit of the synchronous rectifier control circuit comprises:

(a) a reference voltage source for providing the prescribed value;

(b) a comparator having a first input connected to the synchronous rectification period determination capacitor of the synchronous rectifier control circuit, and a second input connected to the reference voltage source; and (c) a logic circuit having a first input connected to the conduction period detect means of the synchronous rectifier control circuit, and a second input connected to the comparator, for causing conduction through the synchronous rectifier switch when the active switch is off and at the same time when the voltage across the synchronous rectification period determination capacitor is higher than the reference voltage.

21. A switching-mode power supply as defined in claim 1, wherein the synchronous rectifier switch control pulse forming circuit of the synchronous rectifier control circuit comprises:

(a) a first logic circuit connected to the synchronous rectification period determination capacitor of the synchronous rectifier control circuit for providing an output indicative of whether the voltage across the synchronous rectification period determination capacitor is higher than a preset threshold or not; and (b) a second logic circuit having a first input connected to the conduction period detect means of the synchronous rectifier control circuit, and a second input connected to the first logic circuit, for causing conduction through the synchronous rectifier switch when the active switch is off and at the same time when the voltage across the synchronous rectification period determination capacitor is higher than the threshold.

22. A switching-mode power supply as defined in claim 1, wherein the synchronous rectifier control circuit is in the form of an integrated circuit.

23. A switching-mode power supply as defined in claim 1, wherein the synchronous rectifier switch and the rectifying diode and the synchronous rectifier control circuit are packaged in a unitary envelope.

24. A switching-mode power supply for DC-to-DC conversion, comprising:

(A) DC input means for inputting a DC voltage;

(B) DC output means for outputting a DC voltage;

(C) inductance means connected between the DC input means and the DC output means;

(D) switching means including an active switch connected between the DC input means and the inductance means for switching the DC input voltage on and off;

(E) an active switch control circuit connected to the active switch for on/off control thereof;

(F) a smoothing capacitor connected between the inductance means and the DC output means;

(G) a synchronous rectifier switch connected in parallel with a serial connection of the inductance means and the smoothing capacitor;

(H) a rectifying diode connected in parallel with the synchronous rectifier switch; and (I) a synchronous rectifier control circuit connected to the synchronous rectifier switch for on/off control thereof, the synchronous rectifier control circuit comprising:

(a) a synchronous rectification period determination capacitor for providing a voltage for determination of periods of time during which the synchronous rectifier switch is to conduct;

(b) a charge circuit connected to the synchronous rectification period determination capacitor for charging the same during the conducting periods of the active switch;

(c) a discharge circuit connected to the synchronous rectification period determination capacitor for permitting the flow of a current discharged therefrom;

(d) active switch status means for providing an active switch status signal indicative of whether the active switch is on or off;

(e) conduction period detect means connected to the active switch status means for providing, in response to the active switch status signal, a signal indicative of periods of time during which the synchronous rectifier switch is to be held conductive;

(f) a synchronous rectifier switch control pulse forming circuit having inputs connected to the synchronous rectification period determination capacitor and the conduction period detect means, and an output connected to the synchronous rectifier switch, for causing conduction through the synchronous rectifier switch when the voltage across the synchronous rectifier period determination capacitor is higher than a prescribed value and at the same time when the signal from the conduction period detect means indicates that the synchronous rectifier switch be held conductive;

(g) a compulsory discharge switch connected in parallel with the synchronous rectification period determination capacitor; and (h) a compulsory discharge switch control circuit connected to the compulsory discharge switch for causing conduction therethrough for a prescribed period of time following the end of each conducting period of the synchronous rectifier switch or the beginning of each conducting period of the active switch.

25. A switching-mode power supply for DC-to-DC conversion, comprising:

(a) DC input means for inputting a DC voltage;

(b) DC output means for outputting a DC voltage for application to a load to be connected thereto;

(c) inductance means connected between the DC input means and the DC output means;

(d) switching means including an active switch connected between the DC input means and the inductance means for switching the DC input voltage on and off;

(e) an active switch control circuit connected to the active switch for on/off control thereof;

(f) a smoothing capacitor connected to the DC output means and in series with the inductance means;

(g) a synchronous rectifier switch connected in parallel with the serial connection of the inductance means and the smoothing capacitor;

(h) a rectifying diode connected in parallel with the synchronous rectifier switch;

(i) a synchronous rectification period determination capacitor for providing a voltage for determination of periods of time during which the synchronous rectifier switch is to conduct;

(j) a charge circuit connected to the synchronous rectification period determination capacitor for charging the same during the conducting periods of the active switch;

(k) a discharge circuit connected to the synchronous rectification period determination capacitor for permitting the flow of a current discharged therefrom;

(l) active switch status means for providing an active switch status signal indicative of whether the active switch is on or off;

(m) conduction period detect means connected to the active switch status means for providing, in response to the active switch status signal, a signal indicative of periods of time during which the synchronous rectifier switch is to be held conductive;

(n) a synchronous rectifier switch control pulse forming circuit having inputs connected to the synchronous rectification period determination capacitor and the conduction period detect means, and an output connected to the synchronous rectifier switch, for causing conduction through the synchronous rectifier switch when the voltage across the synchronous rectifier period determination capacitor is higher than a prescribed value and at the same time when the signal from the conduction period detect means indicates that the synchronous rectifier switch be held conductive; and (o) means included in the synchronous rectifier switch control pulse forming circuit for holding the synchronous rectifier switch nonconductive when the power requirement of the load is less than a predefined limit that is less than a load rating.

* * * * *